US011318607B2

(12) United States Patent
Graham et al.

(10) Patent No.: US 11,318,607 B2
(45) Date of Patent: May 3, 2022

(54) EXTENDED REALITY RIDE TEST ASSEMBLY FOR AMUSEMENT PARK SYSTEM

(71) Applicant: Universal City Studios LLC, Universal City, CA (US)

(72) Inventors: Martin Evan Graham, Clermont, FL (US); Patrick John Goergen, Orlando, FL (US); Tomas Manuel Trujillo, Windermere, FL (US)

(73) Assignee: Universal City Studios LLC, Universal City, CA (US)

( * ) Notice: Subject to any disclaimer, the term of this patent is extended or adjusted under 35 U.S.C. 154(b) by 488 days.

(21) Appl. No.: 16/358,688

(22) Filed: Mar. 19, 2019

(65) Prior Publication Data
US 2020/0215687 A1 Jul. 9, 2020

Related U.S. Application Data

(60) Provisional application No. 62/788,228, filed on Jan. 4, 2019.

(51) Int. Cl.
*B25J 9/16* (2006.01)
*A63G 31/02* (2006.01)
(Continued)

(52) U.S. Cl.
CPC ............ *B25J 9/1633* (2013.01); *A63G 31/02* (2013.01); *B25J 9/1692* (2013.01); *B25J 13/08* (2013.01);
(Continued)

(58) Field of Classification Search
None
See application file for complete search history.

(56) References Cited

U.S. PATENT DOCUMENTS 7,681,468 B2   3/2010 Verl et al.
8,971,821 B2   3/2015 Schlub et al.
(Continued)

FOREIGN PATENT DOCUMENTS

CN    206583860    10/2017
CN    108211365    6/2018
JP    H07264632    10/1995

OTHER PUBLICATIONS

Rodney A. Brooks et al.; "The Cog Project: Building a Humanoid Robot"; MIT Artificial Intelligence Lab, pp. 1-36.
(Continued)

*Primary Examiner* — Talha M Nawaz
(74) *Attorney, Agent, or Firm* — Fletcher Yoder, P.C.

(57) ABSTRACT

An amusement park attraction includes a ride vehicle configured to travel along a path of the amusement park attraction, an attraction controller configured to generate virtual elements, and a robot assembly disposed on the ride vehicle. The head of the robot assembly is configured to adjust positions relative to the ride vehicle. The amusement park attraction further includes a headset communicatively coupled to the attraction controller and a camera disposed in the head of the robot assembly. The headset is configured to be disposed on the head of the robot assembly. The headset is also configured to display the virtual elements generated by the attraction controller based on a headset position in the amusement park attraction. The camera is configured to acquire data indicative of the virtual elements displayed by the headset.

20 Claims, 11 Drawing Sheets

(51) Int. Cl.
  *G06F 3/14* (2006.01)
  *H04N 5/225* (2006.01)
  *G06F 3/01* (2006.01)
  *B25J 13/08* (2006.01)
  *H04N 5/247* (2006.01)
  *G06T 7/00* (2017.01)

(52) U.S. Cl.
  CPC ............... *G06F 3/012* (2013.01); *G06F 3/14* (2013.01); *H04N 5/2253* (2013.01); *H04N 5/247* (2013.01); *G06T 7/0002* (2013.01)

(56) References Cited

U.S. PATENT DOCUMENTS

| | | | |
|---|---|---|---|
| 9,573,524 B2 | 2/2017 | Kim | |
| 9,933,624 B1* | 4/2018 | White | A63G 31/02 |
| 2013/0083018 A1* | 4/2013 | Geisner | G06F 3/011 |
| | | | 345/420 |
| 2013/0083062 A1* | 4/2013 | Geisner | G02B 27/017 |
| | | | 345/633 |
| 2016/0225191 A1 | 8/2016 | Mullins | |
| 2018/0095526 A1 | 4/2018 | Mao | |
| 2018/0297209 A1 | 10/2018 | Low et al. | |
| 2019/0004598 A1* | 1/2019 | Gordt | G06F 3/012 |
| 2019/0217210 A1* | 7/2019 | Kang | G06F 3/0304 |
| 2019/0227328 A1* | 7/2019 | Coatney | G06T 19/006 |
| 2019/0321735 A1* | 10/2019 | Zamperla | A63G 31/16 |
| 2021/0089040 A1* | 3/2021 | Ebrahimi Afrouzi | A47L 9/2894 |

OTHER PUBLICATIONS

Tamotsu Machino et al.; "Remote-Collaboration System Using Mobile Robot with Camera and Projector"; Human Interaction Project, NTT Cyber Solutions Laboratories, pp. 1-6.
PCT/US2020/012018 International Search Report and Written Opinion dated Apr. 1, 2020.

* cited by examiner

EXTENDED REALITY RIDE TEST ASSEMBLY FOR AMUSEMENT PARK SYSTEM

CROSS REFERENCE TO RELATED APPLICATIONS

This application claims priority from and the benefit of U.S. Provisional Application Ser. No. 62/788,228, entitled "EXTENDED REALITY RIDE TEST ASSEMBLY FOR AMUSEMENT PARK SYSTEM," filed Jan. 4, 2019, which is hereby incorporated by reference.

BACKGROUND

The present disclosure relates generally to the field of amusement park entertainment. More specifically, embodiments of the present disclosure relate to a system to simulate attractions.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light and not as admissions of prior art.

Amusement parks include a variety of features providing unique experiences to each park guest. For example, the amusement park may include an attraction that incorporates extended reality features. That is, the attraction may generate and display virtual elements that each guest of the attraction may observe while the attraction is in operation. In some cases, each guest observes different virtual elements. It may be difficult to determine the virtual elements observed by each guest at a large scale. That is, generating and displaying virtual elements to simulate the experience of each guest of the attraction may be complicated to reproduce in a controlled manner. Thus, developing attractions with extended reality features may be difficult and/or cumbersome.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an amusement park attraction includes a ride vehicle configured to travel along a path of the amusement park attraction, an attraction controller configured to generate virtual elements, and a robot assembly disposed on the ride vehicle. The head of the robot assembly is configured to adjust positions relative to the ride vehicle. The amusement park attraction further includes a headset communicatively coupled to the attraction controller and a camera disposed in the head of the robot assembly. The headset is configured to be disposed on the head of the robot assembly. The headset is also configured to display the virtual elements generated by the attraction controller based on a headset position in the amusement park attraction. The camera is configured to acquire data indicative of the virtual elements displayed by the headset.

In an embodiment, an amusement park attraction includes a ride vehicle configured to travel along a path of the amusement park attraction, an attraction controller configured to generate virtual elements, a headset disposed on the ride vehicle, and a robot assembly disposed on the ride vehicle. The headset is configured to display the virtual elements generated by the attraction controller based on a position of the headset in the amusement park attraction, and the robot assembly includes a head, and a camera disposed in the head, in which the camera is configured to acquire data indicative of the virtual elements displayed by the headset when the amusement park attraction is in operation. Furthermore, the amusement park attraction includes a sensor configured to detect an operating parameter of the amusement park attraction and a controller communicatively coupled to the robot assembly, in which the controller is configured to control the adjustment of a position of the head based on the operating parameter.

In an embodiment, a robot assembly of an amusement park attraction includes a head, a camera disposed in a cavity of the head, and an adjuster configured to couple to a ride vehicle of the amusement park attraction. The head is configured to couple to a headset of the amusement park attraction, the camera is configured to acquire data indicative of virtual elements displayed via the headset, and the adjuster is configured to adjust a position of the head relative to the ride vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
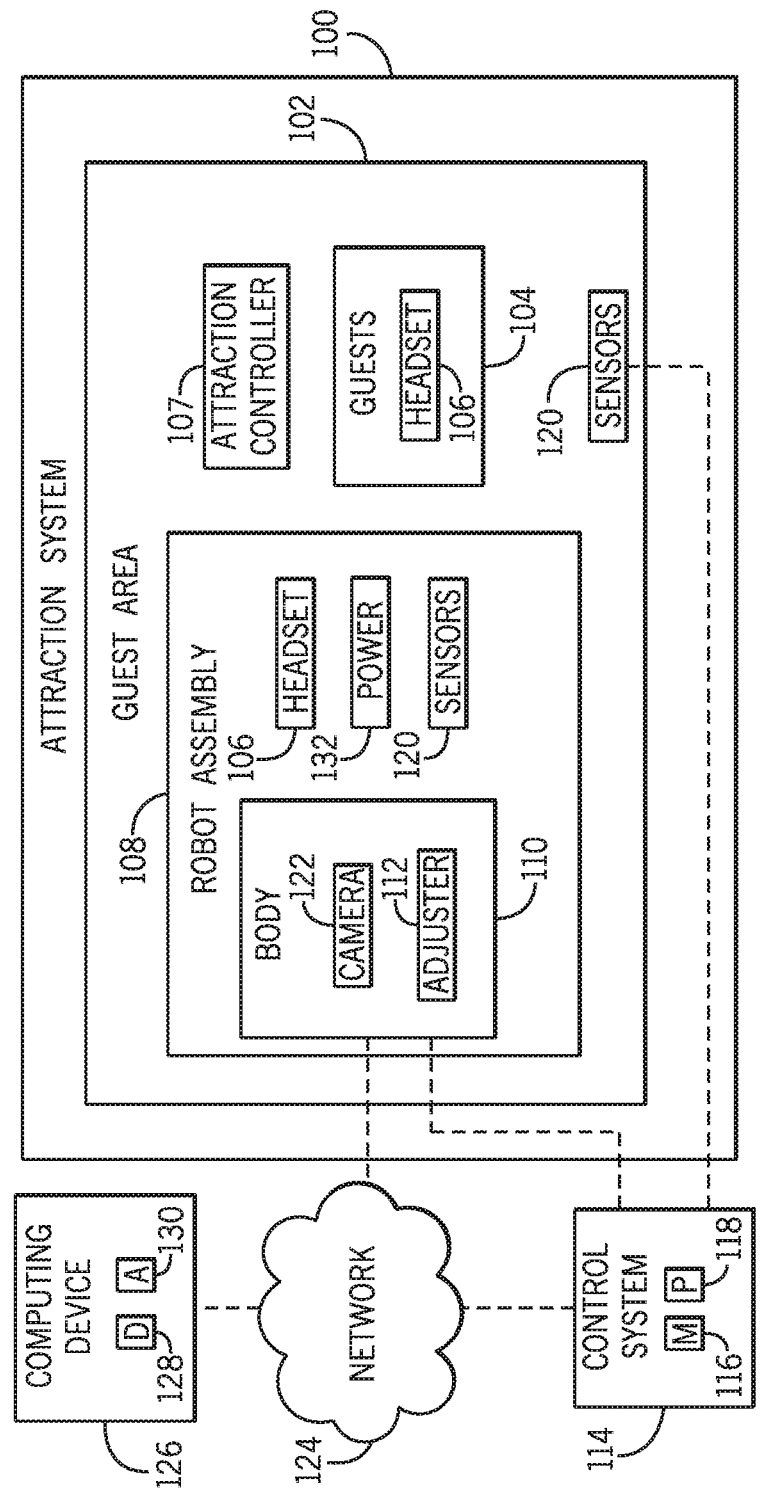
FIG. 1 is a schematic view of an embodiment of an attraction that includes a robot assembly to capture generated virtual elements, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to an amusement park attraction that entertains guests of the amusement park. Attractions may include live shows, tracked rides, stationary rides, and other types of attractions, to provide a variety of ways for the amusement park to entertain guests. Each attraction may also use different effects to provide a particular experience for the guests. For example, the attraction may use fear, humor, excitement, and so forth, to induce a certain sentiment of the guests. Increasingly, amusement parks are implementing different ways of enhancing a guest's experience. For instance, an attraction may supplement a guest's experience with extended reality features. The extended reality features may enable an attraction to provide a flexible and effective way to entertain each guest.

As used herein, extended reality refers to incorporating virtual elements, such as projected images, into the real environment. Extended reality may include virtual reality, augmented reality, and/or mixed reality. As used herein, virtual reality refers to replacing the entire, or almost the entire, real environment with a virtual environment. That is, virtual reality may generate images, sounds, and other elements to replicate an immersive, virtual environment. As used herein, augmented reality refers to overlaying virtual elements on top of the real environment. Augmented reality may project images, generate sound, manipulate haptic senses, and so forth, which supplement the real environment. However, interaction with the virtual elements may be limited. As used herein, mixed reality refers to projecting virtual elements into the real environment, in which the virtual elements may be interactive. For example, mixed reality may project a virtual element that may move based on movement of a guest. By implementing extended reality, virtual images may be projected for each guest to view, limiting a number of physical objects that would otherwise be manufactured, installed, or otherwise provided on the attraction.

As will be discussed in this disclosure, extended reality may be created at an attraction via a headset worn by each guest on the attraction. As used herein, a headset refers to a device that may be worn by a guest and may be implemented to display virtual elements that may be generated by an attraction controller of the attraction and experienced by the guest. Although this disclosure primarily discusses headsets that display virtual images to be seen and sounds to be heard by guests, it should be appreciated that headsets may additionally or alternatively project virtual smells, haptics, etc. In general, the virtual elements may be generated to enhance the guest experience. For example, the virtual elements may impart a particular emotion to the guest, which may be limited if performed via physical objects. Specifically, the headset may display elements that may be inefficient or difficult to replicate in the real world. For example, the headset may display a variety of characters and/or environments viewable by the guest wearing the headset. The headset may also project sounds associated with the characters and environments. In this manner, numerous elements, which may replace physical objects, such as animatronics, robots, show performers, and the like, are generated to enhance guest experience on the attraction. The virtual elements may be controlled more efficiently than real elements. By way of example, virtual elements may be added, removed, and otherwise manipulated via programming of the headset, rather than via physical positioning of the real elements. Additionally, virtual elements may not be limited to parameters of the attraction, including a weight capacity, a location, and/or a size of the attraction. Thus, virtual elements may provide greater opportunities to enhance the guest experience than physical objects.

The attraction controller may generate virtual elements based on certain parameters of the attraction. In one example, certain virtual elements may be generated based on operation of the attraction, such as at particular time intervals of the attraction. Additionally, the headset may display virtual elements based on interaction of the guests, such as a movement, a location, and/or a positioning of the guests. For example, different guests may see different virtual elements and/or different guests may see the same virtual elements at different perspectives based on where the guest is positioned, where the guest is facing, and so forth.

As should be appreciated, identification and review of the generated virtual elements may facilitate testing and/or developing the attraction. Specifically, emulating the behavior of guests on the attraction may allow the display of virtual elements via the headset as would be experienced by guests. Furthermore, recording the displayed virtual elements may allow determination of the guest experience. As used herein, simulation of guest experience includes the simulation of guest behavior and the subsequent recording of the displayed virtual elements. Simulation of guest experience may facilitate determining if additional elements (e.g., virtual elements) may be included, if existing elements may be removed or modified, and/or if other modifications may be made in the attraction to enhance the guest experience. Determining the visual elements experienced by a guest via the headset may be achieved by an individual wearing the headset while emulating guest behavior (e.g., generating movement similar to how a guest may move in the attraction). In this manner, the individual may experience visual elements that a guest may encounter on the attraction. However, simulation of guest experience via individual experiences of the attraction may be cumbersome and inefficient. For example, the view of the individual wearing the headset may not be recorded and may only be viewable to the individual while the individual is wearing the headset on the attraction. Thus, repeating the view of the individual may include repeating the experience of the attraction. Additionally, in some cases, simulation of guest experience via experiencing the attraction by an individual may not be readily available and may depend on availability of individuals and readiness of the attraction to accommodate individuals.

Thus, in accordance with certain embodiments of the present disclosure, a system that enables determination of virtual elements viewable by guests via a headset may facilitate developing and/or testing of certain attractions. In particular, the system may enable recording and/or projection of the virtual elements that are displayed by the headset, which may result in greater accessibility of the simulated guest experience. Additionally, the system may be operated without having an individual physically present on the attraction. Therefore, simulation of guest experience may not be constrained by limitations of the individual or by limitations of the attraction's capability to accommodate individuals. In one embodiment, the system may include a robot assembly. The robot assembly may be implemented to wear a headset and may include a camera to record, process, and/or transfer data representing virtual images displayed by the headset. The robot assembly may also be implemented to move within the attraction to emulate movement of guests, which may manipulate virtual images displayed by the headset. In this manner, the robot assembly may be used to simulate the guest experience in the attraction.

Turning now to the drawings, FIG. 1 is a schematic view of an embodiment of an attraction system 100 for an amusement park. The attraction system 100 may include a guest area 102 in which a guests 104 may be positioned. That is, the guests 104 may be located (e.g., sit or stand) in the guest area 102 during at least a duration of when the attraction system 100 is in operation. In one embodiment, the guest area 102 may not be stationary. For example, the guest area 102 may be a ride vehicle that is implemented to move about a designated area of the attraction system 100, such as along a path of the attraction system 100. Additionally, it should be understood that an embodiment of the attraction system 100 may include multiple guest areas 102 that may each accommodate guests of the attraction system 100. The attraction system 100 may include several effects that enhance the experience of the guests 104. The effects may include physical objects that guests 104 may be able to view, audio elements that the guests 104 may hear, and other elements that the guests 104 may be able to interact with from the guest area 102.

In addition to effects, the attraction system 100 may implement extended reality features via a headset 106. The guests 104 may wear a corresponding headset 106. The attraction system 100 may further include one or more attraction controllers 107 that are communicatively coupled to each headset 106. The attraction controller 107 may be configured to generate virtual elements for each headset 106 to display. Thus, during operation of the attraction system 100, each guest 104 may view virtual elements generated by the respective headsets 106. Each headset 106 may be implemented to display substantially the same types of virtual visual elements for each guest 104, such as according to a theme of the attraction system 100. However, the virtual visual elements viewable to each guest 104 may be different. In one embodiment, the guests 104 may view different virtual visual elements at different locations of the guest area 102 and/or the attraction system 100. The guests 104 may also view different virtual visual elements based on the direction that the guests 104 face. Indeed, each headset 106 may update the display of the virtual visual elements based on a perspective of the guests 104 to enable the guests 104 to view the virtual visual elements as if the virtual visual elements are physical objects in a real environment. For example, each headset 106 may include sensors that detect a position of each guest 104, a force imparted upon the headset 106, a direction of the force imparted upon the headset 106, another suitable parameter, or any combination thereof, to determine the virtual visual elements to display. In this manner, the virtual visual elements are displayed in a realistic and interactive manner.

Additionally, the attraction controller 107 may generate virtual audio elements for the headset 106 to project for each guest 104 to hear. Similar to the virtual visual elements, the audio outputs may be generated based on a particular parameter. Indeed, the generated audio outputs may be associated with the displayed visual virtual elements, which may further increase the realistic presentation of the elements. For example, an audio output may be associated with a virtual visual element located at a position in the guest's view. The audio outputs may be directionally generated as if produced by the virtual visual element from the position. Furthermore, other components of the attraction system 100 may emit audio outputs. As an example, a ride vehicle, a show element, a track, and the like, may emit audio outputs, such as based on a position of the guests 104 and/or the robot assembly 108 within the attraction system 100.

Further, in a certain embodiment, the attraction controller 107 may be configured to control other elements of the attraction system 100. For example, the attraction controller 107 may control show effects (e.g., lighting), operation of the attraction system 100 (e.g., a speed of a ride vehicle of the attraction system 100), and/or other operating parameters of the attraction system 100. Although FIG. 1 illustrates the attraction controller 107 as positioned within the guest area 102, the attraction controller 107 may be positioned in any suitable area of the attraction system 100, or may be communicatively coupled to the attraction system 100 and control the attraction system 100 from a remote location.

The guest area 102 may also accommodate a robot assembly 108 that may emulate behavior of the guests 104. In particular, an embodiment of the headset 106 that is substantially the same of a user headset may be placed on the robot assembly 108 and display virtual elements as if the robot assembly were the guest 104. The robot assembly 108 may emulate movement of the guest 104 and portray behavior of the guest 104 in the attraction system 100 in order to induce the headset 106 to display virtual elements as if the robot assembly 108 were the guest 104. For example, the robot assembly 108 may include a body 110 implemented to move how the guest 104 would move. The body 110 may include an adjuster 112 implemented to provide movement of the robot assembly 108 to emulate movement of the guest 104. In one embodiment, the adjuster 112 may also enable the robot assembly 108 to be adjusted to a desired position. For example, the adjuster 112 may enable a height of the robot assembly 108 to be adjusted and/or a position of the robot assembly in the guest area 102 to be adjusted. Thus, the positioning and the movement of the robot assembly 108 may more closely match that of the guest 104 of the attraction system 100.

In one embodiment, a control system 114 that is separate from the attraction controller 107 may be communicatively coupled to the robot assembly 108 to allow the control system 114 to monitor and control the robot assembly 108. The control system 114 may include a memory 116 and a processor 118. The memory 116 may be a mass storage device, a flash memory device, removable memory, or any other non-transitory computer-readable medium that includes instructions regarding control of the robot assembly 108. The instructions may include algorithms, models (e.g., inverse kinematics models), data storage, and so forth. The memory 116 may also include volatile memory such as randomly accessible memory (RAM) and/or non-volatile memory, such as hard disc memory, flash memory, and/or other suitable memory formats. The processor 118 may execute the instructions stored in the memory 116. The control system 114 may be communicatively coupled to sensors 120 implemented to detect certain parameters. For example, the sensors 120 may be disposed on the robot assembly 108 and may detect a position of the robot assembly 108 within the attraction system 100, a movement of the robot assembly 108, a force imparted on the robot assembly 108, a direction of the force imparted on the robot assembly 108, another parameter of the robot assembly 108, or any combination thereof. The sensors 120 may additionally or alternatively be disposed elsewhere in the attraction system 100 and may detect a parameter such as a duration that the attraction system 100 has been in operation, an occurrence of an effect of the attraction system 100, another parameter, or any combination thereof. The sensors 120 may be implemented to transmit a signal indicative of the detected parameters to the control system 114 and, based on the signal, the control system 114 may move the robot assembly 108. In this manner, the control system 114 may move the robot assembly 108 in response to operation of the attraction system 100, which may realistically emulate movement of the guest 104 in the attraction system 100.

Based on the movement of the robot assembly 108, the headset 106 may display certain virtual elements. The robot assembly 108 may include a camera 122 to sense the virtual visual elements displayed by the headset 106, and other elements of the attraction system 100 (e.g., lighting, show elements). In a particular implementation, the robot assembly 108 may also be configured to record virtual audio elements projected by the headset 106. For example, the robot assembly 108 may include a microphone (not shown), such as on the camera 122, that may record the virtual audio elements. The camera 122 may record the visual elements displayed by the headset 106 as data, in which the data may be transferred off the camera 122. In one embodiment, the camera 122 may be communicatively coupled to a network 124 and may transfer recorded data to the network 124. Other devices may also be communicatively coupled to the network 124 and may receive the recorded data. For example, a computing device 126 may be communicatively coupled to the network 124 and may receive the recorded data. The computing device 126 may then output the recorded data. As an example, the computing device 126 may include a display 128, such as a screen, to output the recorded virtual visual elements and an audio device 130, such as speakers, to output the recorded audio outputs and present the virtual elements to a user of the computing device. The outputted recorded data may be used to adjust movement of the robot assembly 108, such as by configuring the control system 114 based on the recorded virtual visual elements.

In one embodiment, the computing device 126 may output the visual elements in real time as the camera 122 records the visual elements (e.g., streaming). In another embodiment, the computing device 126 includes, or is communicatively coupled to, a database that is implemented to store the data recorded by the camera 122, in which the recorded data may be retrieved and played back. Thus, the user of the computing device 126 may access the database to retrieve the virtual elements at a desirable time. In a further embodiment, information detected by the sensors 120 may also be detected. For example, information associated with certain operating parameters of the robot assembly 108 and/or of the attraction system 100 may be recorded and transferred to the network 124. In this manner, the computing device 126 may also retrieve data regarding the robot assembly 108 and/or the attraction system 100 in addition to presenting the virtual elements.

The robot assembly 108 may also include or be coupled to a power source 132 that provides power to the robot assembly 108 and enables the robot assembly 108 to operate. In a sample embodiment, the power source 132 may be a battery (e.g., a rechargeable battery) included within the robot assembly 108. However, the power source 132 may also be an external power source that the robot assembly 108 may couple to, such as via a plug. For example, the power source 132 may be provided in the guest area 102 to which the robot assembly 108 may be coupled.

For purposes of discussion, this disclosure primarily focuses on applications of the robot assembly 108 for the attraction system 100, where a ride vehicle travels along a path. In particular, guests 104 may be seated on the ride vehicle and wear the headset 106 to enhance the experience of the guests 104, such as by providing a virtual environment for the guests 104 as the ride vehicle is traveling. However, it should be appreciated that the robot assembly 108 may also be implemented in other types of attractions 100, such as an interactive area in which the guests 104 may roam around and interact with certain elements of the attraction system 100.

Figure 2:
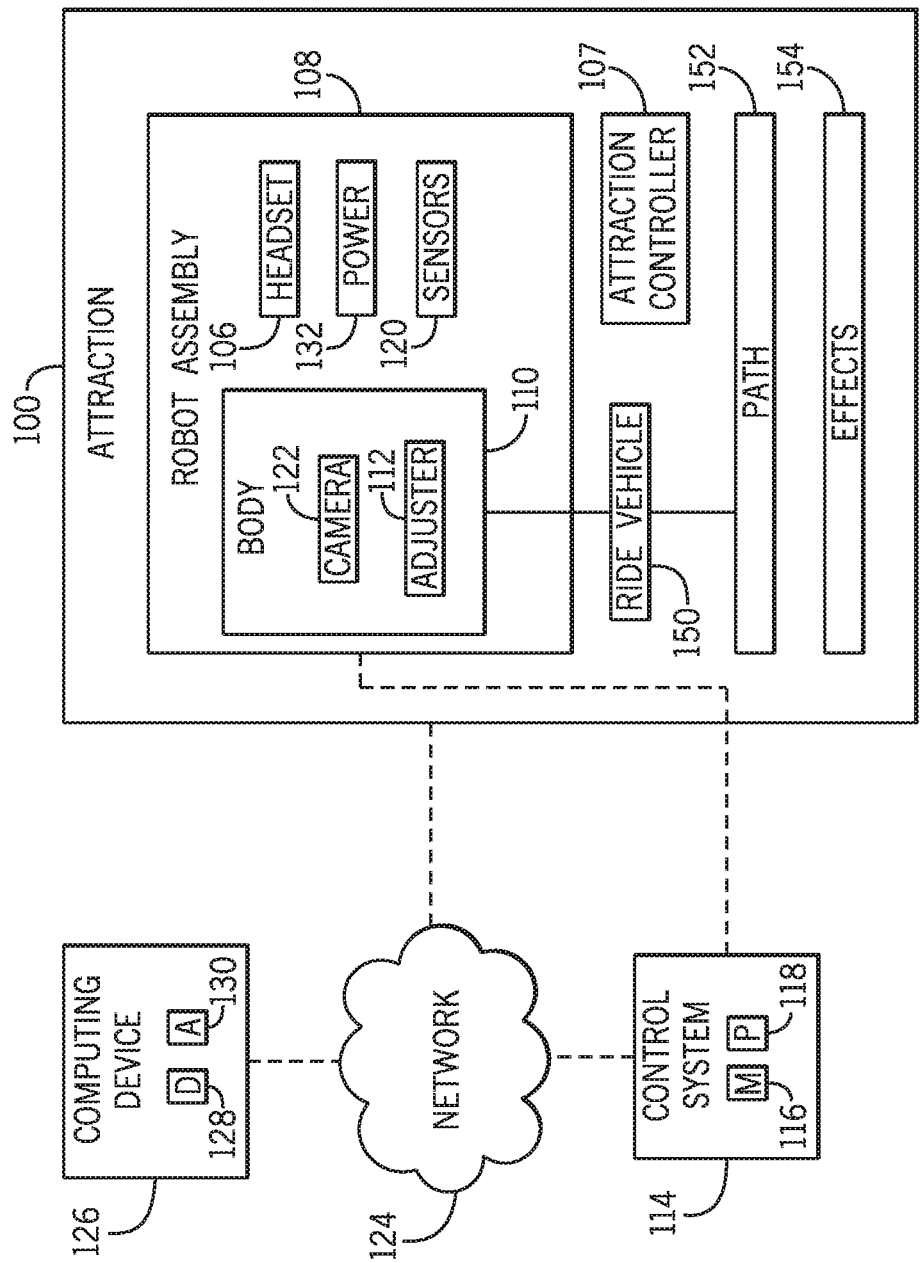
FIG. 2 is a schematic view of an embodiment of an attraction that includes a ride vehicle and a robot assembly disposed in the ride vehicle, in accordance with an aspect of the present disclosure.

FIG. 2 is a schematic view of an embodiment of the attraction system 100 that includes the robot assembly 108, in which the robot assembly 108 is implemented to couple to a ride vehicle 150 of the attraction system 100. The ride vehicle 150 may be implemented to travel along a path 152 of the attraction system 100. For example, the ride vehicle 150 may be coupled to rails of a track that guide the ride vehicle 150 along the path 152. The path 152 may include path variations, such as turns, elevation changes (e.g., inclines, declines), and other path variations (e.g., loops, helixes) that may induce a sensation in the guests 104 to enhance their experiences. The attraction system 100 may further include effects 154 to enhance the guest experience. The effects 154 may be produced by the ride vehicle 150 and/or may be external to the ride vehicle 150, and may include elements such as music, water, lighting, and so forth.

Each guest 104 of the illustrated embodiment of the attraction system 100 may also wear a corresponding one of the headsets 106 that is communicatively coupled to the attraction controller 107. Based on the effects 154 and/or the path 152, the guest 104 may move and the headset 106 may display virtual elements accordingly. For example, as the ride vehicle 150 travels along the path 152, the virtual elements may be displayed based on the movement of the ride vehicle 150. In other words, the virtual elements may be displayed as if the guest 104 were to be traveling along with the virtual elements in the real world. In addition, the ride vehicle 150 traveling along the path 152 may induce physical movement by the guest 104 (e.g., due to inertia), which may further adjust the display of the virtual elements based on the physical movement of the guest 104. Moreover, the guest 104 may be encouraged to look in a certain direction during a duration of the attraction system 100, for example using the effects 154, and the virtual elements may be displayed accordingly. In general, the virtual elements may be displayed based on movement of the guest 104 and/or the attraction system 100 to present a realistic representation of the virtual elements, as if the guest 104 were perceiving the virtual elements in the real world.

The robot assembly 108 may be secured or coupled to the ride vehicle 150 to enable the camera 122 of the robot assembly 108 to record the displayed virtual elements as the attraction system 100 is operated. For example, the camera 122 may record the virtual elements displayed as the ride vehicle 150 travels along the path 152. Additionally, the adjuster 112 may move the robot assembly 108 as induced by the ride vehicle 150 traveling along the path 152 and may face a particular direction during a time interval in which the attraction system 100 is operating and/or for a certain duration in which the attraction system 100 is operating to emulate behavior of the guests 104.

It should also be appreciated that the robot assembly 108 may be positioned in the ride vehicle 150 similarly to the guests 104. That is, the robot assembly 108 may be seated in the ride vehicle 150 and/or constrained (e.g., with seat restraints) as the guests 104 would. In one embodiment, the ride vehicle 150 includes the power source 132, such as a power source outlet positioned on or adjacent to every seat of the ride vehicle 150, and the robot assembly 108 may be coupled to the power source 132 to be positioned in the ride vehicle 150. In this manner, the robot assembly 108 may be positioned at any seat of the ride vehicle 150 by coupling to the corresponding power source 132. While positioned in the ride vehicle 150, the headset 106 may also be attached to the robot assembly 108 as the headset 106 would be worn by the guests 104. That is, the headset 106 may be fit and secured around a part of the robot assembly 108 shaped similarly to a head of the guests 104. In general, the robot assembly 108 may be implemented to move, behave, and be positioned similarly to the guests 104 such that the virtual elements are displayed as if one of the guests 104 were wearing the headset 106.

Figure 3:
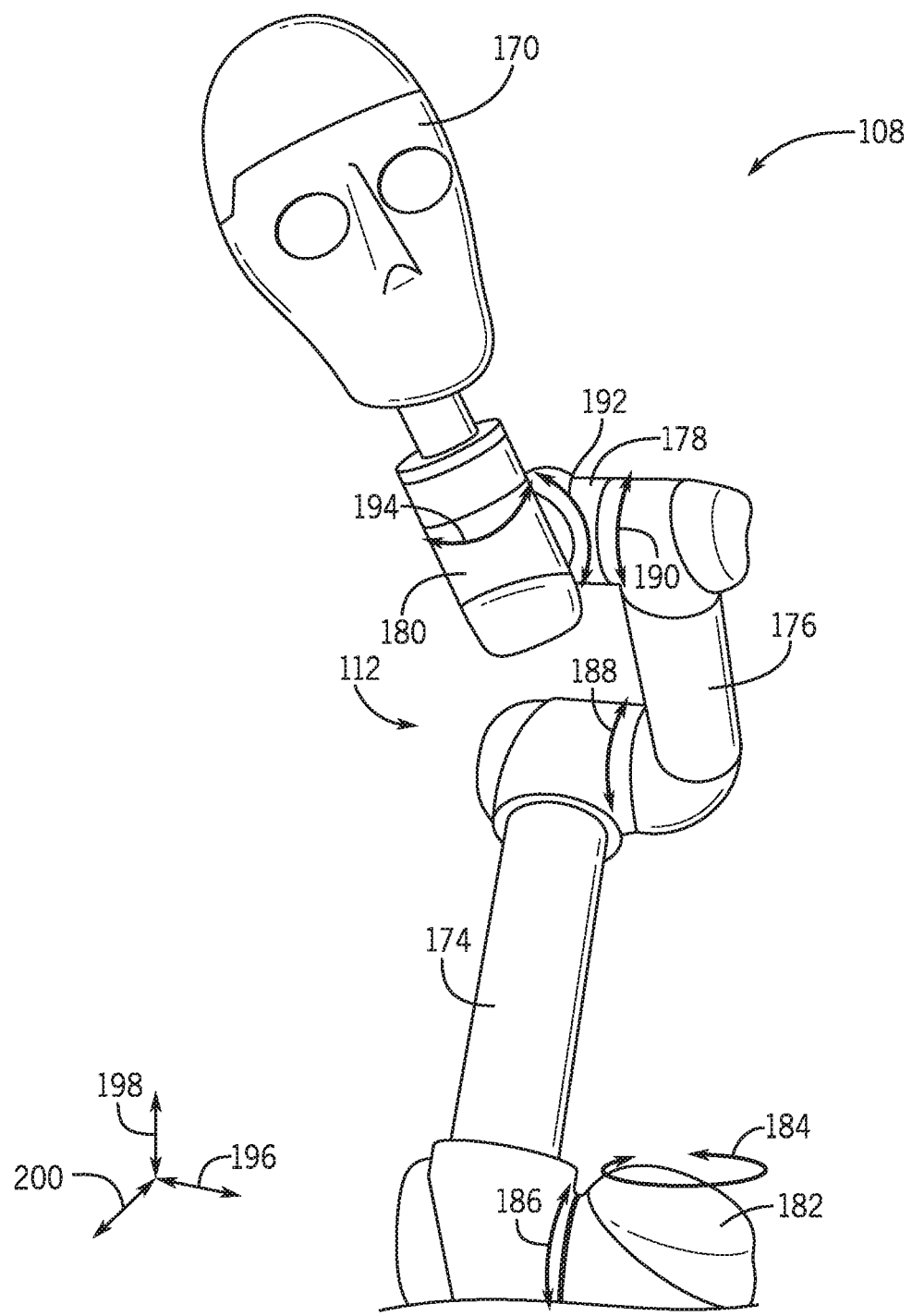
FIG. 3 is a perspective view of an embodiment of a robot assembly implemented to capture generated virtual elements, in accordance with an aspect of the present disclosure.

FIG. 3 is a perspective view of an embodiment of the robot assembly 108 that may move similarly to the guests 104. The robot assembly 108 may include a head 170 implemented to wear the headset 106 and the adjuster 112 implemented to move the head 170. In general, the adjuster 112 may move the head 170 to a certain position via a particular movement substantially similar to a position and movement of the guests 104 on the attraction 100. For example, the robot assembly 108 may be configured to set the head 170 at a starting position having an origin reference point (e.g., a coordinate point of [0,0,0] of an x-y-z coordinate system). The adjuster 112 may be configured to move the head 170 to different positions (e.g., to other coordinate points of the x-y-z coordinate system) relative to the origin reference point to emulate the position of a head of one of the guests 104. Although the head 170 of FIG. 3 includes substantially human features, in an additional or alternative embodiment, the head 170 may include other features, such as other shapes having mounts to receive sensors and/or the headset 106. In the illustrated embodiment, the adjuster 112 may include a first segment 174 rotatably coupled to a second segment 176, and a third segment 178 rotatably coupled to the second segment 176. The third segment 178 may be coupled to a head segment 180 coupled to the head 170. Additionally, the first segment 174 may be coupled to a base segment 182 rotatably coupling the first segment 174 to a base (not shown). The segments 174, 176, 178, 180, 182 may be coupled to one another at moveable joints to enable the corresponding movements, in which the movement of the respective segments 174, 176, 178, 180, 182 about one another may move the head 170. In one embodiment, multiple other segments may be coupled to the base segment 182. As such, a single base segment 182 may support multiple robot assemblies 108 that move independently of one another.

For example, the base segment 182 may move in a first rotational direction 184, the first segment 174 may move in a second rotational direction 186 about the base segment 180, the second segment 176 may move in a third rotational direction 188 about the first segment 174, the third segment 178 may move in a fourth rotational direction 190 about the second segment 176, the head segment 180 may move in a fifth rotational direction 192 about the head segment 180, and/or the head 170 may move in a sixth rotational direction 194 about the head segment 180. Movement of the respective segments 174, 176, 178, 180, 182 may also move the head 170 in a first linear direction 196, a second linear direction 198, and/or a third linear direction 200. By way of example, simultaneous rotation of the first segment 174 and of the second segment 176 may move the head in the second linear direction 198, which may be a substantially vertical direction. In general, movement of the segments 174, 176, 178, 180, and 182 may move the position of the head 170 to emulate movement of a head of one of the guests 104 in the ride vehicle 150, such as by emulating torso movement of the guests 104. For example, the segments 174, 176, 178, 180, and 182 may collectively move to emulate leaning movement of one of the guests 104.

The control system 114 may be communicatively coupled to each of the segments 174, 176, 178, 180, 182 and/or the head 170 to move the robot assembly 108. As an example, each of the segments 174, 176, 178, 180, 182 and/or the head 170 include an actuator such that, when the actuator is activated via instructions of the control system 114, the robot assembly 108 may move. In one embodiment, the amount of movement produced by the actuators of the segments 174, 176, 178, 180, 182 and/or the head 170 may be calibrated to more closely align with movement of the guests 104 in the ride vehicle 150. Particularly, the sensors 120 of the robot assembly 108 may be used to detect parameters such as a speed of the ride vehicle 150, an acceleration of the ride vehicle 150, a shift in weight of the ride vehicle 150, another parameter that may induce movement in the guests 104, or any combination thereof, and the actuators may be activated in response to the detected parameters. It should be understood that the amount of movement produced by each actuator based on the detected parameters may be different from one another and may be set via experimental testing, or based on a specific instance of data received from a historical collection of data. Further, the set amount of movement produced by each actuator may be adjusted, such as to emulate the guests 104 that move at different amounts. Thus, a larger number of recorded data may be available that captures a variety of guest behavior.

In another embodiment, in addition to the aforementioned rotational direction of movements, each segment 174, 176, 178, 180, 182 and/or the head 170 may also extend and retract to add an additional way of moving the robot assembly 108. Additionally, each segment 174, 176, 178, 180, 182 and/or the head 170 may move in a different manner relative to one another than the rotational directions 184, 186, 188, 190, 192, 194. In a further embodiment, the robot assembly 108 may include a different number of segments 174, 176, 178, 180, 182, such as more segments to increase a number of ways in which the robot assembly 108 may move. Further still, the size of each segment 174, 176, 178, 180, 182 may be different than depicted in FIG. 3. Indeed, in a certain embodiment, a particularly dimensioned adjuster 112 may be produced by selecting segments 174, 176, 178, 180, 182 of different sizes.

Figure 4:
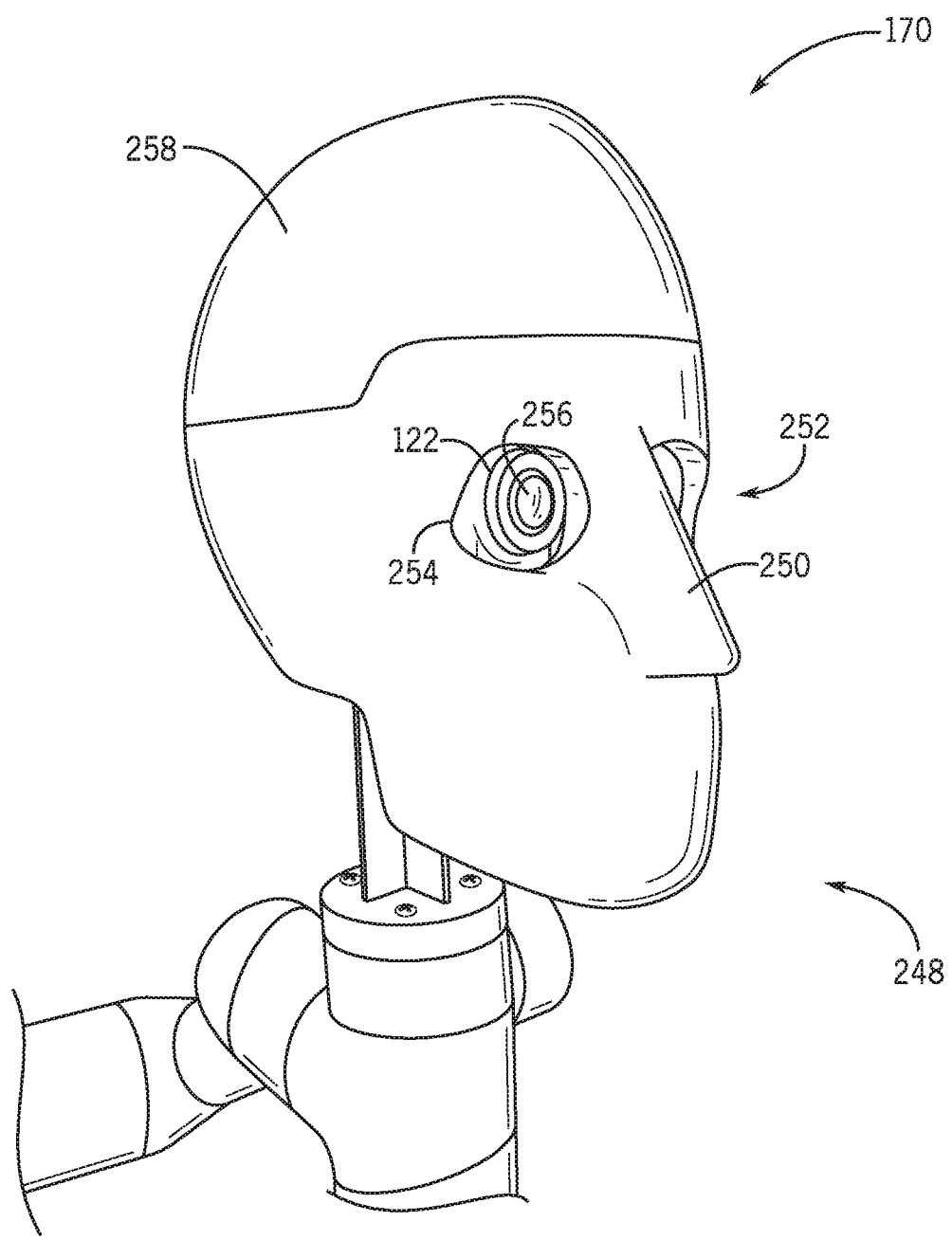
FIG. 4 is a perspective view of an embodiment of a head of a robot assembly configured to capture aspects of a ride having generated virtual elements, in accordance with an aspect of the present disclosure.

FIG. 4 is an expanded perspective view of an embodiment of the head 170 of the robot assembly 108. In the illustrated embodiment, the head 170 includes a face portion 248 with facial features and dimensions (e.g., a circumference) similar to that of the guests 104. Specifically, the head 170 may include a nose 250 and an eye cavity 252. In one embodiment, the head 170 may also include ears. Although FIG. 4 illustrates that the facial features are formed with the head 170, it should be understood that in one embodiment, the facial features may be formed separately from a remainder of the face portion 248. For example, the nose 250 may be formed separately and may be coupled to the face portion 248. Thus, the facial features may enable greater flexibility to configure the head 170 with different features to match the guests 104. In an additional or an alternative embodiment, there may be face portions 248 of different dimensions, in which a particularly sized face portion 248 may be selected for the robot assembly 108 to match a head of a particular dimension. Thus, the facial features may permit the headset 106 to fit onto the head 170 as the headset 106 may fit onto the head of the guests 104 (e.g., skin, hair). Additionally, the facial features may permit movement of the headset 106 about the head 170 as the headset 106 may move on the head of the guests 104 during operation of the attraction system 100. In other words, in response to movement of the robot assembly 108 about the ride vehicle 150, the headset 106 may also move about the head 170. To this end, the head 170 may be made from materials that have a texture similar to that of the guests 104. Additionally, the head 170 may be made from materials that are lightweight, as not to add undesirable weight that may affect movement of the head 170, and the head 170 may be made from materials that are insulative, as to avoid affecting data recorded by the cameras 122. For example, the head 170 may be made from rubber, polymer, composite, another suitable material, or any combination thereof.

The camera 122 may be positioned within the head 170 to allow image capture from the perspective of the robot assembly 108. In the illustrated embodiment, the eye cavity 252 may include openings 254 to permit the camera 122 to project out of the face portion 248 and to have an obstructed view. Specifically, a lens 256 of one of the cameras 122 may project through one of the openings 254 to enable the camera 122 to record virtual images generated via the headset 106. In one embodiment, the lens 256 may be implemented to move within the camera 122 to emulate eye movement by the guests 104, thereby changing the perspective of the camera 122 to view different virtual visual elements without moving a remainder of the head 170. In an additional or alternative embodiment, the lens 256 may be fisheye lens having a field of view wider than the typical field of view of the guests 104. Thus, when the user views the recording, the user may view more virtual visual elements than typically viewable by the range of view of the guests 104. In this manner, the recording includes virtual visual elements that would be viewable to the guests 104 via movement of eyes. That is, the wide field of view encompasses multiple perspectives that would otherwise be achieved via eye movement of the guests 104.

As illustrated in FIG. 4, the head 170 includes a cap 258 disposed atop the face portion 248. Specifically, the cap 258 may cover a cavity of the head 170 in which the camera 122 may be inserted. However, in another embodiment, the camera 122 may be inserted into the cavity in another manner, such as from a side of the face portion 248, and thus, the cap 258 may be coupled to the face portion 248 in a different arrangement. In another sample embodiment, the cap 258 may be coupled to the face portion 248, but may be adjustable (e.g., via a hinge) to reveal the cavity of the face portion 248 to insert the camera 122 therein.

As previously described, the head 170 may be made from different materials, such as a rubber, polymer, and/or composite material. The head 170 may also be manufactured via different manufacturing processes. For example, the head 170 may be formed via molding (e.g., injection molding), additive manufacturing, extrusion, another suitable manufacturing process, or any combination thereof. It should be appreciated that the face portion 248 and the cap 258 may be made from substantially the same material and/or manufacturing process. Additionally, different heads 170 may be produced to have different weights to match the weights of different heads of the guests 104 and accurately emulate movement and behavior (e.g., inertial movement) of the guests 104.

In one embodiment, the head 170 may include other modifications to match with features of the guests 104. In one example, coverings of different colors may be disposed on the head 170 to match different complexion shades of the guests 104. As another example, different headwear, accessories (e.g., jewelry), and other features (e.g., facial hair) may be disposed on the head 170 to match different characteristics of the guests 104. Thus, the head 170 may portray a variety of head attributes to obtain data from the headset 106 representative of a variety of the guests 104 that may wear the headset 106.

Figure 5:
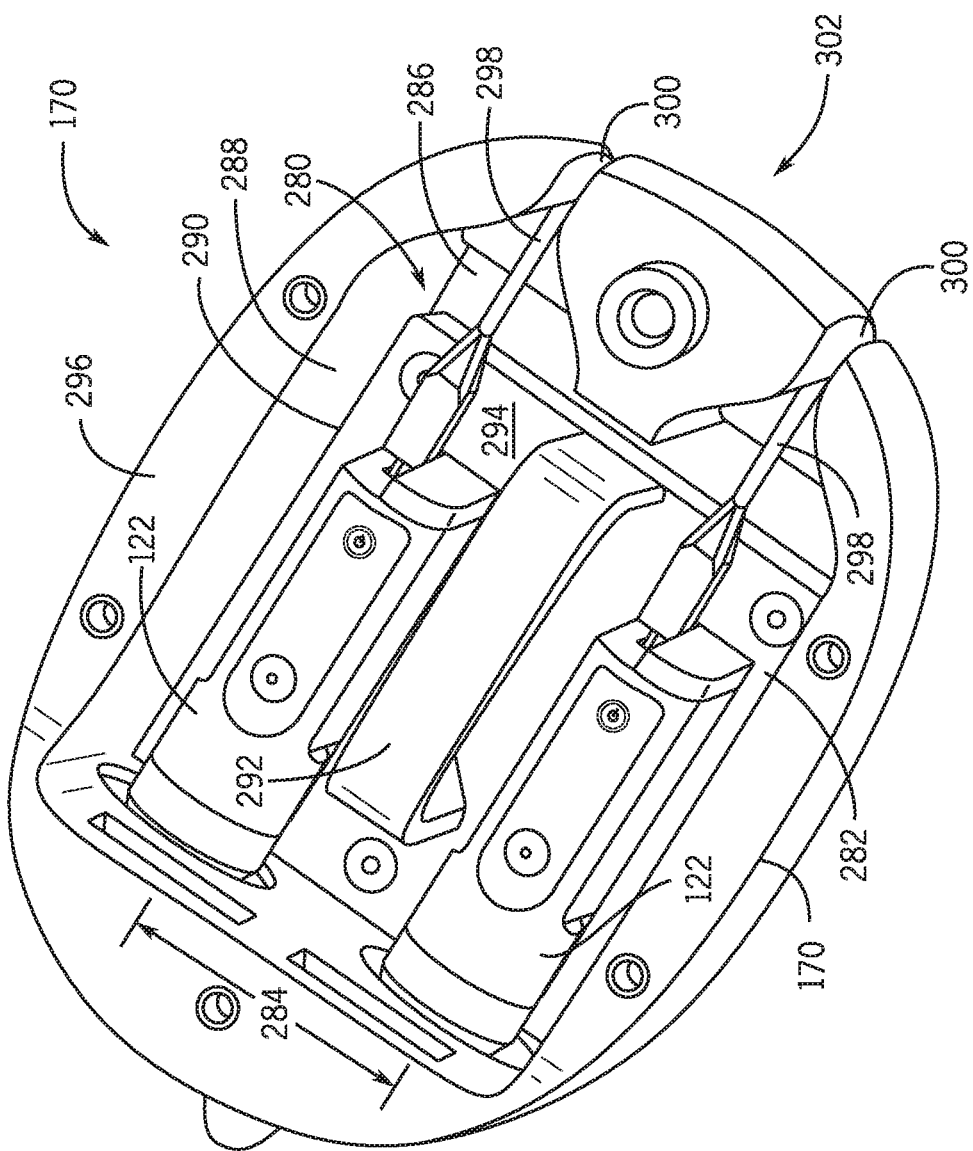
FIG. 5 is an overhead perspective view of internal components contained within the head of the robot assembly of FIG. 4, in accordance with an aspect of the present disclosure.

FIG. 5 is an overhead perspective view of an embodiment of the head 170 illustrating a cavity 280 in which the camera 122 may be positioned. In the illustrated embodiment, two separate cameras 122 may be disposed on a tray 282 within the cavity 280. The tray 282 may secure the cameras 122 within the cavity 280 and also may separate the respective lens 256 of the cameras 122 at a particular distance 284 from one another. The lens 256 of each camera 122 may be representative of an individual eye of the guests 104 and the distance 284 represents an interpupillary distance, or the distance between the pupils of eyes of the guests 104.

Indeed, different trays 282 may include different distances 284. For example, the distance 284 may range from 30 millimeters (mm) to 80 millimeters (mm). Thus, different trays 282 may include a different distance 284, in which each respective distance 284 is between 50 mm and 80 mm. As such, a certain tray 282 may be selected and positioned within the face portion 248 based on the distance 284. To this end, the tray 282 may be removably coupled to the cavity 280, such as via fasteners and/or clips, to enable different trays 282 to be coupled to and removed from the cavity 280. Each tray 282 may be implemented to be placed atop a face portion base 286 and within cavity walls 288 of the cavity 280. In one embodiment, each camera 122 may be positioned atop a tray base 290 of the tray 282 in which the dimensions of the tray base 290 substantially align with the dimensions of the cavity walls 288. In other words, the sides of the tray base 290 may abut the cavity walls 288, thereby limiting a movement of the tray 282 within the cavity 280. In a sample embodiment, different trays 282 having different distances 284 may have tray bases 290 of the substantially same dimension. Additionally, different heads 170 may include cavities 280 of the same dimension. In this manner, any tray 282 may fit into the cavity 280 of any head 170. Thus, a particular head 170 may be selected based on a desired feature and any tray 282 may be selected and fit into the selected head 170 to replicate particular facial features of the guests 104.

In a certain embodiment, the tray 282 may also include a handle 292 to facilitate placement and removal of the tray 282 with respect to the cavity 280. The handle 292 may form an arch shape extending laterally from a face 294 of the base, thereby enabling an individual to grasp the handle 292 to place the tray 282 within the cavity 280 and/or to remove the tray 282 from the cavity 280. In a certain embodiment, the cavity 280 may extend a particular depth within the head 170 such that, when the tray 282 is placed within the cavity 280, the handle 292 does not extend past a surface 296 of the head 170.

Each camera 122 disposed on the tray 282 may be associated with (e.g., coupled to) a corresponding cable 298. The cables 298 may place the camera 122 in communication with certain devices, such as to enable each camera 122 to transfer captured or recorded data and/or to control the camera 122. For example, the device may enable the camera 122 to transfer recorded data to the network 124 and/or may enable remote control of the camera 122 to begin or to stop recording data. As illustrated in FIG. 5, each cable 298 may extend from the cameras 122 within the cavity 280 through a respective aperture 300 disposed at a side 302 of the face portion base 286. The apertures 300 enable the cables 298 to extend from the head 170 without impingement to facilitate coupling to a device positioned exterior to the cavity 280. Although FIG. 5 illustrates that the face portion 248 includes two apertures 300, the face portion 248 may include any suitable number of apertures 300 that may enable the cables 298 to extend outwardly from the cavity 280 accordingly.

Figure 6:
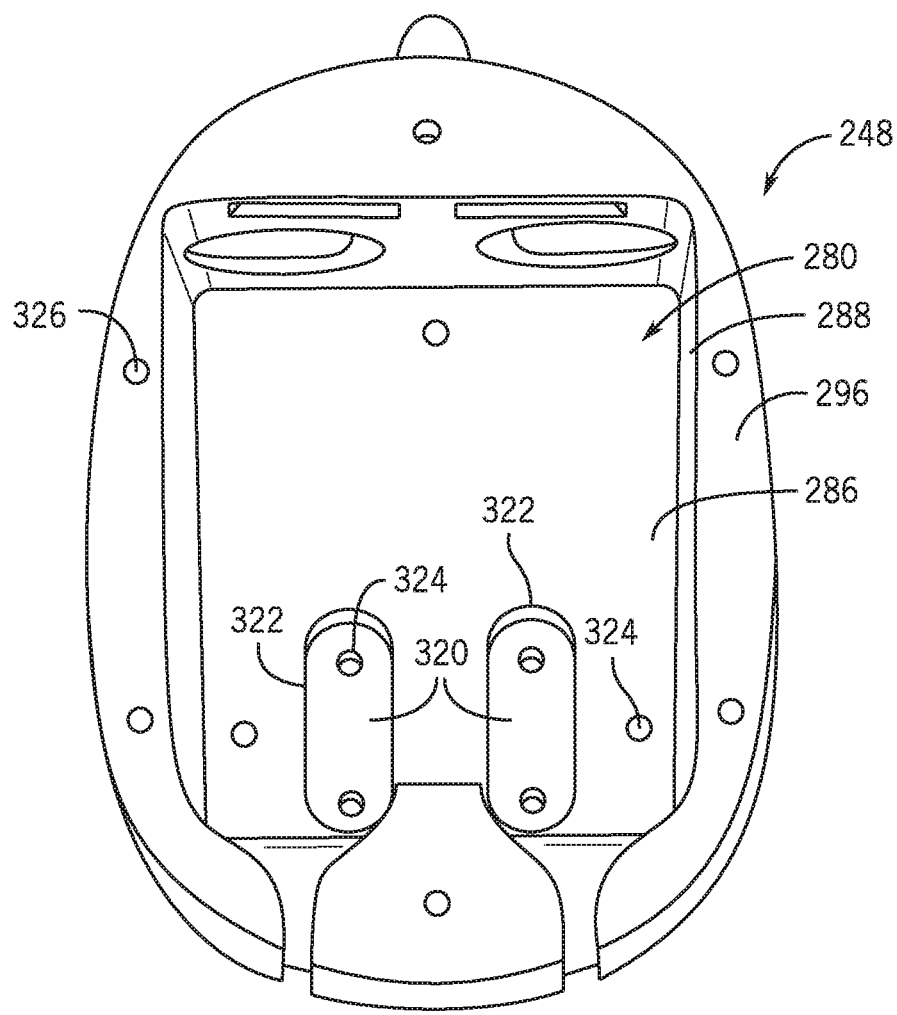
FIG. 6 is a top view of the head of FIG. 5 without the internal components, in accordance with an aspect of the present disclosure.

FIG. 6 is a top view of an embodiment of the head 170 without the tray 282 disposed within the cavity 280. The illustrated cavity 280 also includes recesses 320 to facilitate positioning the tray 282 in the cavity 280. For example, a portion of the tray 282 may fit within the recesses 320 to position the tray 282 within the cavity 280. Therefore, the tray 282 may abut recess walls 322 of the recesses 320 in addition to the cavity walls 288, further limiting movement of the tray 282 positioned within the cavity 280. Additionally, when the tray 282 fits within the recesses 320, a surface of the tray 282 may be substantially flush with the face portion base 286. Although FIG. 6 depicts the cavity 280 and the recesses 320 as having a particular shape, it should be understood that in another embodiment, the cavity 280 and/or the recesses 320 may have another suitable shape for the tray 282 to be disposed therein.

The cavity 280 may include holes 324 disposed within each recess 320 and/or through the face portion base 286 to facilitate coupling of the tray 282 with the face portion base 286. For example, each hole 324 may be a threaded hole that enables a screw or other fastener to protrude therethrough to tighten the tray 282 onto the face portion base 286. Similarly, the surface 296 of the face portion 248 may also include holes 326. The holes 326 may enable the cap 258 to couple with the face portion 248, such as via fasteners.

Figure 7:
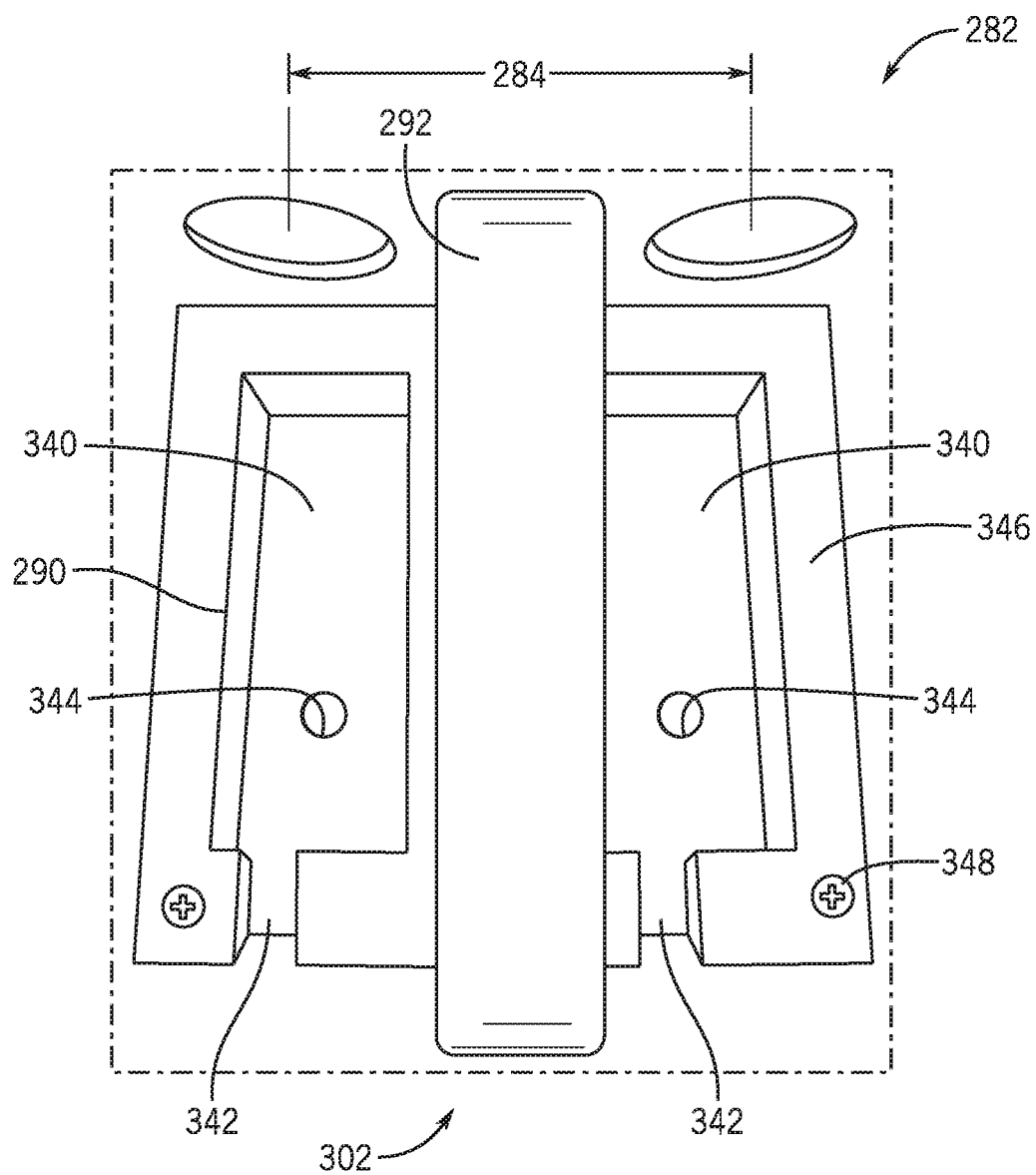
FIG. 7 is a top partial view of an embodiment of a tray integrated in a head of a robot assembly, in accordance with an aspect of the present disclosure.

FIG. 7 is a top partial view of an embodiment of the tray 282. In the illustrated embodiment, the tray 282 includes cavities 340 for positioning the cameras 122. The cavities 340 are depicted as having a substantially rectangular shape, but the cavities 340 may include any suitable shape for the cameras 122 to be positioned therein. In an embodiment, the same type and/or model of camera 122 may be used for each head 170 and, accordingly, each cavity 340 may have substantially the same shape. However, in an additional or alternative embodiment, a different type and/or model of camera 122 may be implemented in which each camera 122 may have a different shape than one another. As such, trays 282 with cavities 340 of a different shape may be formed to accommodate the different cameras 122. As previously described, the lens 256 of the respective cameras 122 are separated by the distance 284 from one another. Each cavity 340 may be formed within the tray 282 to position the cameras 122 such that the respective lens 256 are separated by the distance 284. The cavities 340 may have consistent shapes and sizes, and adapters for different camera models and/or different distance 284 may be provided.

The cavities 340 may each also have a space 342 disposed adjacent to the side 302. The space 342 may facilitate inserting the cables 298 into the cameras 122 disposed within the respective cavities 340. Furthermore, the tray 282 may include holes 344 disposed within the cavities 340 and/or through a surface 346. Each hole 344 of the tray 282 may align with a hole (e.g., the hole 324 FIG. 6) of the face portion 248. As such, a fastener 348 may be inserted through the hole 344 and the hole 324 and tighten the tray 282 onto the face portion base 286.

Similar to the head 170, the tray 282 may be made from materials that are lightweight and insulative, including rubber, polymer, composite, another material, or any combination thereof. The manufacturing process of the tray 282 may also include similar manufacturing processes of the head 170 described above. In one embodiment, the handle 292 may be manufactured with the base 290 of the tray 282, but additionally or alternatively, the handle 292 may be manufactured separately from the base 290, in which the handle 292 and the base 290 may be coupled to one another after formation. Additionally, in a certain embodiment, the tray 282 may be manufactured to have a shape different than depicted in FIG. 7 to fit within the cavity 280 therein. For example, the cavity 280 may have a substantially circular shape and accordingly, the tray 282 (e.g., the base 290 of the tray 282) may include a substantially circular shape.

Figure 8:
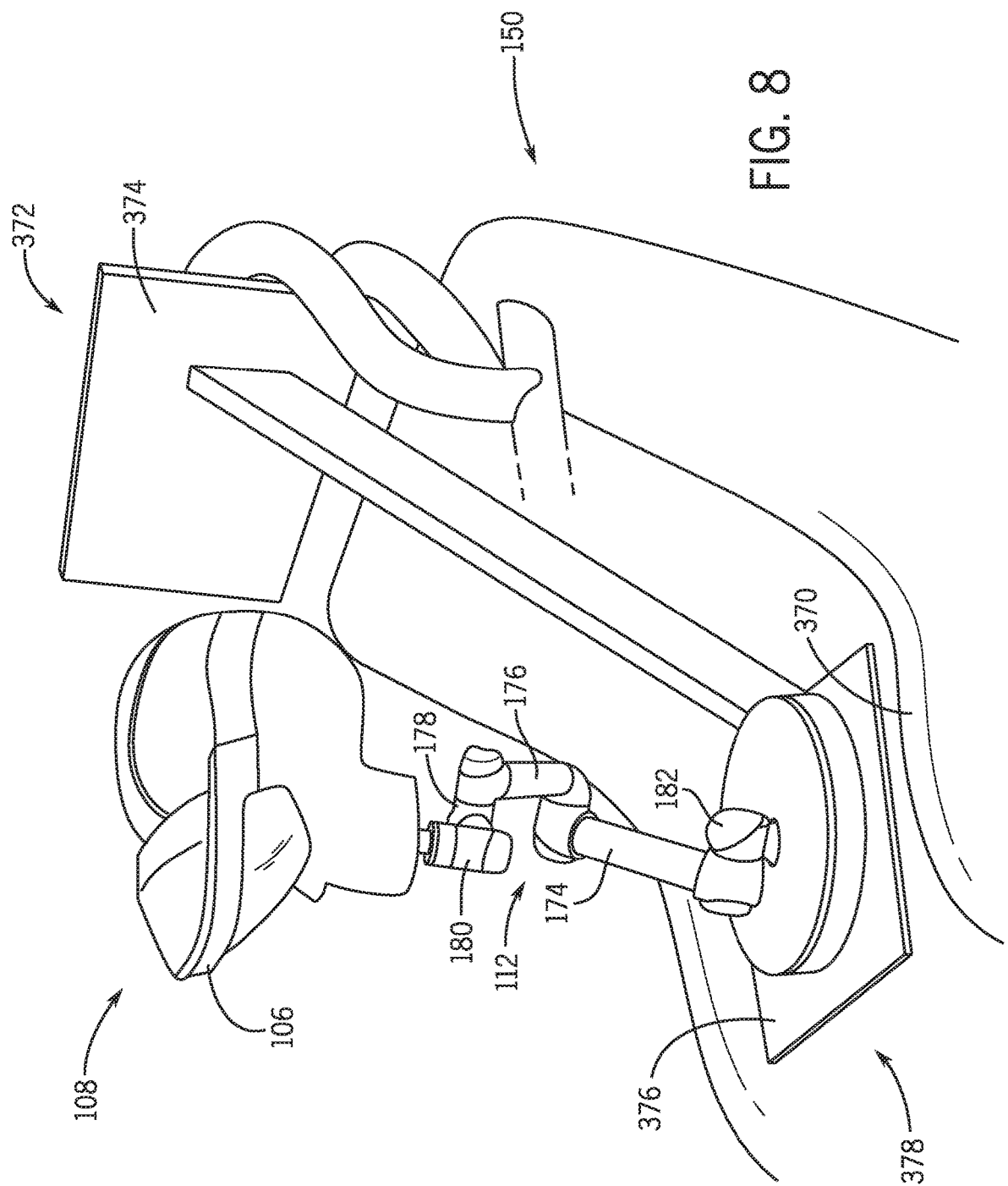
FIG. 8 is a side perspective view of an embodiment of a robot assembly coupled to a ride system, in accordance with an aspect of the present disclosure.

FIG. 8 is a perspective view of an embodiment of the robot assembly 108 positioned on a seat 370 of the ride vehicle 150. In an embodiment, multiple robot assemblies 108 may be positioned on the ride vehicle 150, each coupled to a different seat 370. Although FIG. 8 illustrates that a robot assembly 108 is coupled to the seat 370, in an additional or alternative embodiment, the robot assembly 108 may be coupled to another part of the attraction system 100, such as a floor, a track, and the like. As illustrated in FIG. 8, the adjuster 112 of the robot assembly 108 may be coupled to a bracket 372 disposed in the seat 370 of the ride vehicle 150. As an example, the bracket 372 may include a first plate 374 implemented to couple to the seat 370 (e.g., a back and/or a headrest of the seat 370) and a second plate 376 to which the base segment 182 of the adjuster 112 may couple. In one embodiment, the bracket 372 may be coupled to the seat 370 such that movement of the bracket 372 relative to the seat 370 is limited to reduce unwanted movement of the head 170. Additionally, the second plate 376 may be substantially level and adjacent to a seat pan 378 of the seat 370. As such, the adjuster 112 may extend from the seat pan 378 to be positioned in a manner similar to the guests 104 seated on the ride vehicle 150.

The adjuster 112 may be coupled to the bracket 372 in a manner that enables movement of the adjuster 112 to emulate movement of the guests 104 positioned in the ride vehicle 150. For example, the base 182 may be coupled to the second plate 376 via a ball and socket joint to enable the base 182 to rotate about multiple axes. Additionally or alternatively, the base 182 may be coupled to the second plate 376 in a manner that enables translational movement of the base 182 along the second plate 376, such as to emulate the guests 104 sliding in the seat 370 along the seat pan 378. As mentioned, movement of the adjuster 112 may be induced via movement of the ride vehicle 150, such as along the path 152. For instance, movement of the ride vehicle 150 may adjust a position of the seat 370, such as rotation of the seat 370, and the segments 174, 176, 178, 180, 182 and/or the head 170 may also move in response. Specifically, movement of the segments 174, 176, 178, 180, 182 and/or the head 170 may emulate movement of the guests 104.

The adjuster 112 may be calibrated to depict realistic movement of the guests 104 with respect to certain operating parameters of the adjuster 112. That is, the adjuster 112 may move at a speed similar to how quickly the guests 104 may move, to a position similar to which a position the guests 104 may move, in response to a degree of movement of the ride vehicle 150, another suitable parameter, or any combination thereof. Indeed, a respective adjuster 112 of different robot assemblies 108 may be calibrated to move in different manners and emulate movement of different guests 104. For instance, during small movements of the seat 370, such as vibrations, the adjuster 112 may maintain a position of the head 170. However, during large movements of the seat 370, such as during turns, the adjuster 112 may be implemented to move the head 170 to a particular position, at a particular speed, and via a certain movement.

In a certain embodiment, in addition to emulating movement of guests 104, the adjuster 112 may be implemented to position the head 170 to represent the head position of a guest 104. For example, prior to operation of the attraction system 100, the adjuster 112 may adjust a height of the head 170 relative to the seat 370 to replicate a certain height of a guest 104. As an example, the head 170 may be positioned to emulate guests of different temperaments. By way of example, a relaxed guest may be emulated by resting the head 170 on the headrest of the seat 370 during a significant duration of the attraction system 100. However, an excited guest may be emulated by raising the head 170 and positioning the head 170 away from the headrest of the seat 370. Movement of the adjuster 112 may also be calibrated accordingly to emulate movement of guests 104 of different temperaments.

In a further embodiment, the robot assembly 108 may represent multiple guest positions during a single operation of the ride attraction system 100. In other words, while the ride attraction system 100 is operating, the robot assembly 108 may be configured to represent a first guest positioned at a first location in the guest area 102 (e.g., in a first seat 370), and may also be configured to represent a second guest positioned at a second location in the guest area 102 (e.g., in a second seat 370). For example, the control system 114 may be used to selectively represent different guests in the attraction system 100.

As set forth above, the power source 132 (not shown in FIG. 8) may be included in each seat 370 to provide power to the robot assembly coupled to the seat 370. For example, the bracket 372 may couple to the power source 132 and place the power source 132 in communication with the robot assembly 108 to enable the power source 132 to provide power to the robot assembly 108. In an additional or alternative embodiment, the power source 132 may be included in each bracket 372. Thus, the power source 132 may provide power to the robot assembly 108 when the robot assembly 108 is coupled to the bracket 372.

In certain ride configurations, each seat 370 may have an associated one of the headsets 106. In this manner, the robot assembly 108 may be positioned within the seat 370 in a manner that enables the headset 106 to be coupled to the head 170. However, it may also be appreciated that the headset 106 may be separate from each seat 370. Indeed, the headset 106 may be attached to the bracket 372, be attached to the head 170, or may be separate from the head 170, the bracket 372, and the seat 370. As such, the ride seat 370 may include features needed to interface or secure the headset 106 to the ride vehicle 150.

As described above, the position of the head 170 may be determined via sensors 120. For instance, the sensors 120 may be inertial measurement units (IMUs) disposed on or within the head 170 and/or the headset 106, in which the IMUs are configured to detect movement and positioning of the head 170. Additionally or alternatively, the sensors 120 may be an emitter and a receiver, which may each be disposed on the ride vehicle 150, such as on each seat 370, the head 170, and/or the headset 106. The emitter may be implemented to emit a signal to travel away from the seat 370 and, when the head 170 is positioned to obstruct the traveling signal, the signal may be reflected, in which the receiver may be implemented to detect the reflected signal. Based on how the receiver detects the reflected signal, the position of the head 170 may be determined.

Figure 9:
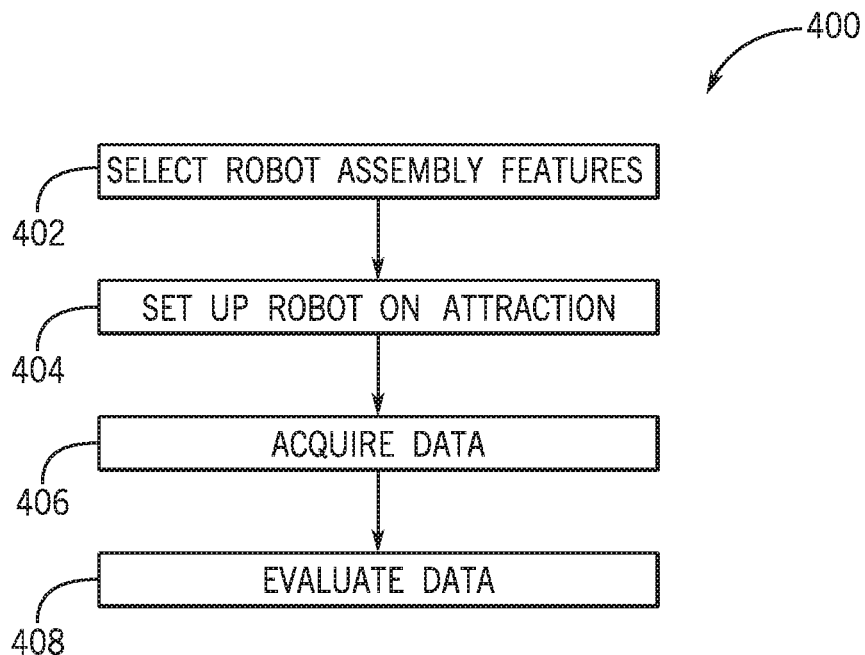
FIG. 9 is a block diagram of an embodiment of a method of incorporating and using a robot assembly in an attraction and acquiring and evaluating data via the robot assembly, in accordance with an aspect of the present disclosure.

FIG. 9 is a block diagram illustrating an embodiment of a method 400 to integrate and use the robot assembly 108 on the attraction system 100 for acquiring and processing data indicative of virtual elements when operating the attraction system 100. It should be noted that each step of FIG. 9 is described in further detail below with respect to FIGS. 10-13. Thus, FIG. 9 presents a brief overview of how the robot assembly 108 may be configured on the attraction system 100.

At block 402, features of the robot assembly 108 are selected. That is, particular dimensions of the robot assembly 108 and facial features of the head 170 may be selected. Selecting the features of the robot assembly 108 may determine how virtual elements are generated via the headset 106. For example, different features of the robot assembly 108 may determine how the robot assembly 108 moves within the seat 370, how the headset 106 moves relative to the head 170 of the robot assembly 108, and so forth. Thus, different features of the robot assembly 108 may be selected to emulate different movements of the guests 104.

At block 404, the robot assembly 108 is set up on the attraction system 100. Setting up the robot assembly 108 may include positioning the robot assembly 108 within the attraction system 100 and enabling the robot assembly 108 to record data accurately. After the robot assembly 108 is set up in the attraction system 100 as desired, the attraction system 100 may be operated.

While the attraction system 100 is operating, data may be acquired, as indicated by block 406. For instance, data indicative of virtual elements may be recorded by the cameras 122 in which the data may include images and/or sounds generated by the headset 106. Data may also be acquired by the sensors 120, in which the data may include parameters detected by the sensors 120. The acquired data may be sent to the network 124 and/or stored on each respective camera 122. Further, in a certain embodiment, the data may be continuously acquired and segmented as appropriate (e.g., on a per-run basis, on a time basis).

At block 408, acquired data is evaluated, such as via the computing device 126. Evaluating data may include using the acquired data to adjust certain parameters of the attraction system 100. For example, the acquired data may be used to adjust parameters of the headset 106, the robot assembly 108 and/or the ride vehicle 150. In general, evaluating data includes using acquired data to adjust performance of the attraction system 100 as desired.

Figure 10:
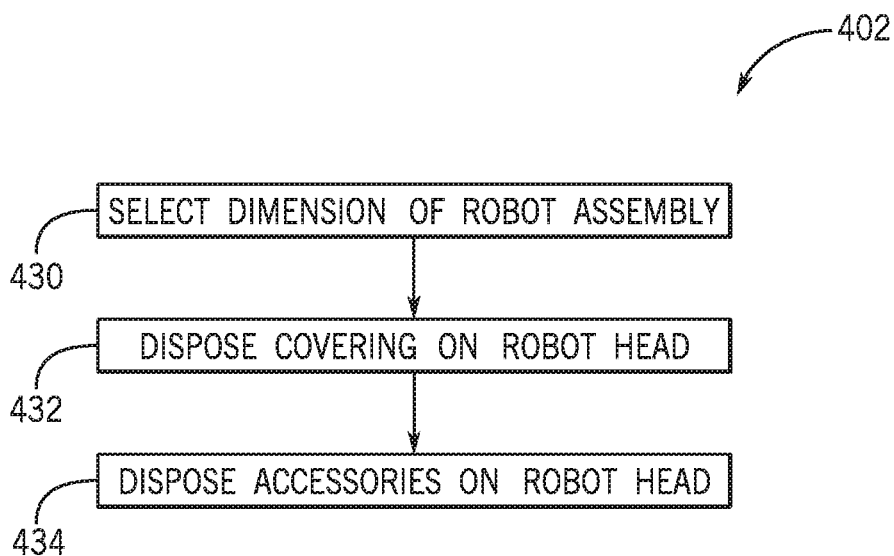
FIG. 10 is a block diagram of an embodiment of a method to select features of a robot assembly, in accordance with an aspect of the present disclosure.

FIG. 10 is a block diagram illustrating an embodiment of certain acts associated with block 402 of FIG. 9 to select features of the robot assembly 108. At block 430, the dimensions of the robot assembly 108 are selected. As previously noted, certain components, such as the head 170, the tray 282, the segments 174, 176, 178, 180, 182 of the adjuster 112, and so forth, of the robot assembly 108 may be sized differently. Such components may be selected to assemble a robot assembly 108 that may move in a particular manner, such as to emulate the guests 104 in a particular manner. That is, guests 104 of different sizes and/or of different behaviors may be emulated by selecting components of particular sizes for the robot assembly 108. For example, a particularly dimensioned adjuster 112 may be assembled by selecting particularly dimensioned segments 174, 176, 178, 180, 182, in which the adjuster 112 may emulate the respective torso of the different guests 104. Likewise, a particularly dimensioned head 170 may be assembled by selecting a particularly dimensioned tray 282, face portion 248, and/or nose 250 in which the head 170 may emulate the respective head of the different guests 104. In an additional or alternative embodiments, certain parameters of the control system 114 may be selected to represent different guests. For example, the parameters may be selected such that the starting position of the robot assembly 108 represents a guest of a particular height.

At block 432, a covering may be disposed on the head 170. As previously mentioned, the covering may adjust various aspects of the head 170 to match different skin attributes of the different guests 104. Additionally or alternatively, the covering may adjust a texture of the head 170 to replicate certain textures that the guests 104 may have, such as hair. For example, the covering may include rougher textures to imitate the guests 104 that may have facial hair. A certain embodiment of the covering may cover substantially all of the head 170. That is, the covering may cover substantially all surfaces of the face portion 248 and the cap 258. An additional or alternative embodiment of the covering may cover a portion of the head 170, such as surface of the face portion 248, but not the cap 258. In this way, the covering may be disposed over the head 170 similar to a mask and may be tightened or loosened based on the dimensions of the head 170 as may have been selected at block 430. The covering may be placed on the head 170 such that movement of the covering relative to the head 170 may be limited, thus limiting unwanted movement of the headset 106 that may adjust the virtual elements generated by the headset 106.

In a particular embodiment, the covering may also include elements to replicate hair features, such as head hair and/or facial hair. However, it should also be understood that a separate covering may be disposed on the head 170 to replicate hair features. Indeed, separate coverings that may include different hairstyles may be selected to replicate the guests 104 that have different hairstyles.

At block 434, additional accessories are disposed on the head 170. The additional accessories may include features such as headwear, jewelry, and/or other facial features that may not be included in the covering. For example, hats, bandanas, and glasses may be disposed on the head 170. In an embodiment, smaller facial hair, such as eyelashes, mustaches, and eyebrows may also be disposed on the head 170.

Figure 11:
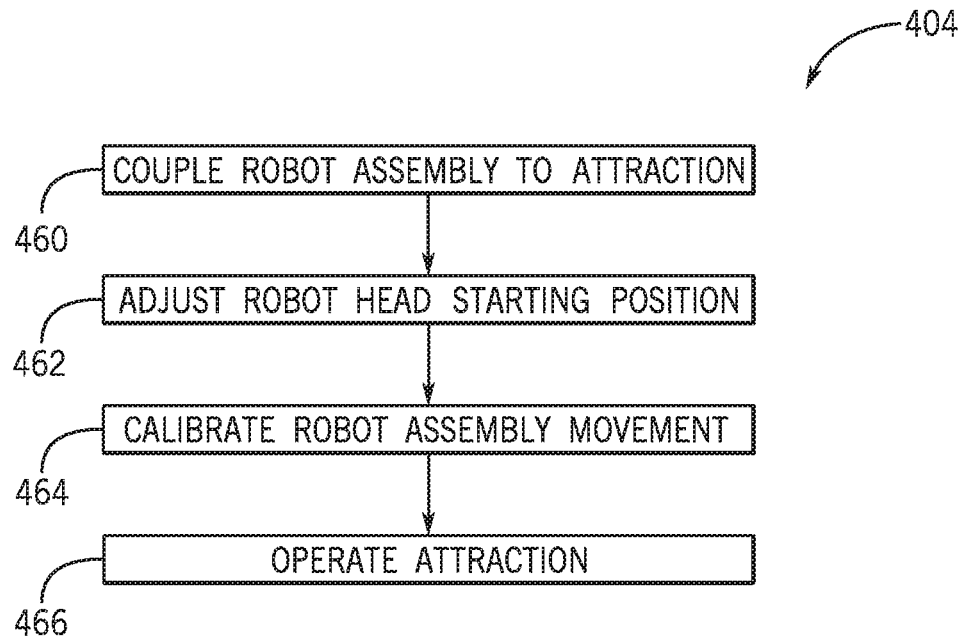
FIG. 11 is a block diagram of an embodiment of a method to set up a robot assembly in an attraction, in accordance with an aspect of the present disclosure.

FIG. 11 is a block diagram illustrating an embodiment of the steps of block 404 to set up the robot assembly 108 on the attraction system 100. At block 460, the robot assembly 108 is coupled to the attraction system 100. For example, in the embodiment illustrated in FIG. 8, in which the attraction system 100 includes the ride vehicle 150, the robot assembly 108 may be coupled to the seat 370. However, it should be understood that for attractions 100 that do not include the ride vehicle 150, such as an interactive area, the robot assembly 108 may be coupled to a transportation device implemented to transport the robot assembly 108 around the interactive area. In any case, the robot assembly 108 may be securely coupled to a feature of the attraction system 100 to limit unwanted movement of the robot assembly 108.

At block 462, when the attraction system 100 is not in operation, the starting position of the head 170 may be set, such as relative to the seat 370. In one example, the height of the head 170 may be set to replicate a particular height of a guest 104. In another example, the position of the head 170 relative to another part of the seat 370, such as the headrest of the seat 370, may be set. In a further example, a direction in which the head 170 is facing may also be set. The starting position of the head 170 may be set manually (e.g., via an operator) and/or may be set or calibrate via the control system 114 relative to an origin reference point.

At block 464, movement of the robot assembly 108 may be calibrated. That is, movement of the robot assembly 108 in reaction to certain elements may be calibrated. For example, movement of the adjuster 112 induced by movement of the attraction system 100 may be calibrated, including a movement speed, a movement amount, an actuation of the actuators of certain segments 174, 176, 178, 180, 182 of the adjuster 112, and so forth. Movement of the robot assembly 108 induced by other effects, such as special effects (e.g., music) of the attraction system 100, may also be calibrated. Indeed, the movement behavior of the robot assembly 108 may be calibrated to represent certain body movements of different guests 104, such as to move the head 170 relative to an origin reference point.

Calibrating the movement of the robot assembly 108 may be performed via the control system 114 and through testing. For example, the control system 114 may set certain parameters of actuators of the segments 174, 176, 178, 180, 182 and/or the head 170 to control movement properties of the robot assembly 108. When the parameters are set, testing may be performed to determine if the set parameters are desirable. An embodiment of testing may include imparting certain forces on the robot assembly 108 and determining if the robot assembly 108 moves in response as desired. By way of example, via testing, it may be determined that the robot assembly 108 is moving too quickly and/or that the robot assembly 108 is not moving the head 170 to a desired position. As a result, the parameters of the control system 114 may be adjusted to adjust the movement of the robot assembly 108 accordingly. In one embodiment, the parameters of the control system 114 may be adjusted during operation of the attraction system 100. For example, the parameters of the robot assembly 108 may dynamically adjust based on the movement of the robot assembly 108. Additionally or alternatively, movement of the robot assembly 108 may be pre-programmed. That is, the robot assembly 108 may be pre-programmed to perform a certain movement at a particular time (e.g., a certain time after the attraction system 100 initiates operation). In this manner, testing may include determining if the robot assembly 108 has moved as desired during the particular time.

After the robot assembly 108 is calibrated and the robot assembly 108 moves as desired, the attraction system 100 may be operated, as indicated at block 466. For the embodiment illustrated in FIG. 2, the ride vehicle 150 may be set in motion on the path 152. In an embodiment of an interactive area, operating the attraction system 100 may include initializing the transportation device to travel along a path of the interactive area. Furthermore, operating the attraction 466 includes recording data, such as via the cameras 122 and/or the sensors 120. Thus, as the attraction system 100 is operating, the robot assembly 108 provides simulation of the attraction system 100 as a guest 104 may experience the attraction system 100.

Figure 12:
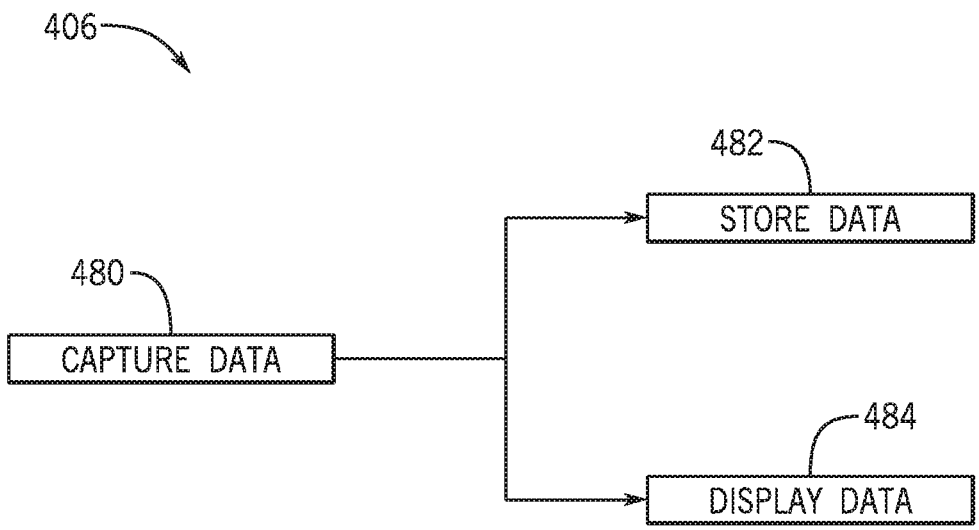
FIG. 12 is a block diagram of an embodiment of a method to acquire data via a robot assembly, in accordance with an aspect of the present disclosure.

FIG. 12 is a block diagram illustrating an embodiment of certain acts associated with block 406 to acquire the data. At block 480, data may be continuously captured (e.g., recorded and/or detected) as the attraction system 100 is in operation. The captured data may include virtual elements generated by the headset 106 and recorded by the camera 122. Data may also include certain operating parameters detected by the headset 106, by the sensor 120, and/or by the control system 114. For example, operating parameters may include a force or weight imparted by the head 170 onto the headset 106, a force or weight imparted by the robot assembly 105 (e.g., the adjuster 112) onto the seat 370, a duration of the operation of the attraction system 100, a position of the head 170, a position of the ride vehicle 150, a speed of the ride vehicle 150, another operating parameter, or any combination thereof. In general, data may include factors that affect the virtual elements generated by the headset 106, including factors that directly affect the generated virtual elements, such as movement of the head 170, and factors that indirectly affect the generated virtual elements, such as factors that induce movement of the head 170.

After data has been recorded and/or detected, the data may be stored, as indicated in block 482. For example, the data may be stored to a memory, such as a database, in which the data may be retrieved and/or accessed at a different time. In one embodiment, captured data may initially be stored in a memory located in the sensor 120 and/or the camera 122. In other words, when the sensor 120 and/or the camera 122 respectively captures data, the data may be directly stored in the sensor 120 and/or the camera 122. In this manner, data may be retrieved from the sensor 120 and/or the camera 122, such as by placing the sensor 120 and/or the camera 122 in communication with the computing device 126. However, in an additional or an alternative embodiment, captured data may be directly transferred from the sensor 120 and/or the camera 122. For example, the sensor 120 and/or the camera 122 may be communicatively coupled to the network 124 and may continuously transfer the data to the network 124 as data is captured. In this manner, the captured data may be retrieved from any device (e.g., the computing device 126) communicatively coupled to the network 124.

Additionally or alternatively, captured data may be displayed, as described in block 484. The captured data may be displayed in real time, or may be played back (e.g., by retrieving from a storage). In one instance, generated virtual images may be displayed on the computing device 126, such as via a screen and/or speakers to enable a user to see and/or hear the virtual elements as the virtual elements are generated by the headset 106. In this manner, the user may simulate the experience of the guests 104 in real-time with the displayed data. In additional or alternative embodiments, the captured data may be displayed on a different headset 106, such as a remote headset 106 that is not a part of the attraction system 100. Further, data, such as data regarding operating parameters, captured by the sensor 120 may also be displayed. In this manner, the generated virtual images may be compared with the operating parameters of the attraction system 100. For example, the user may determine if certain virtual images have been correctly generated at a particular duration of the attraction system 100.

Figure 13:
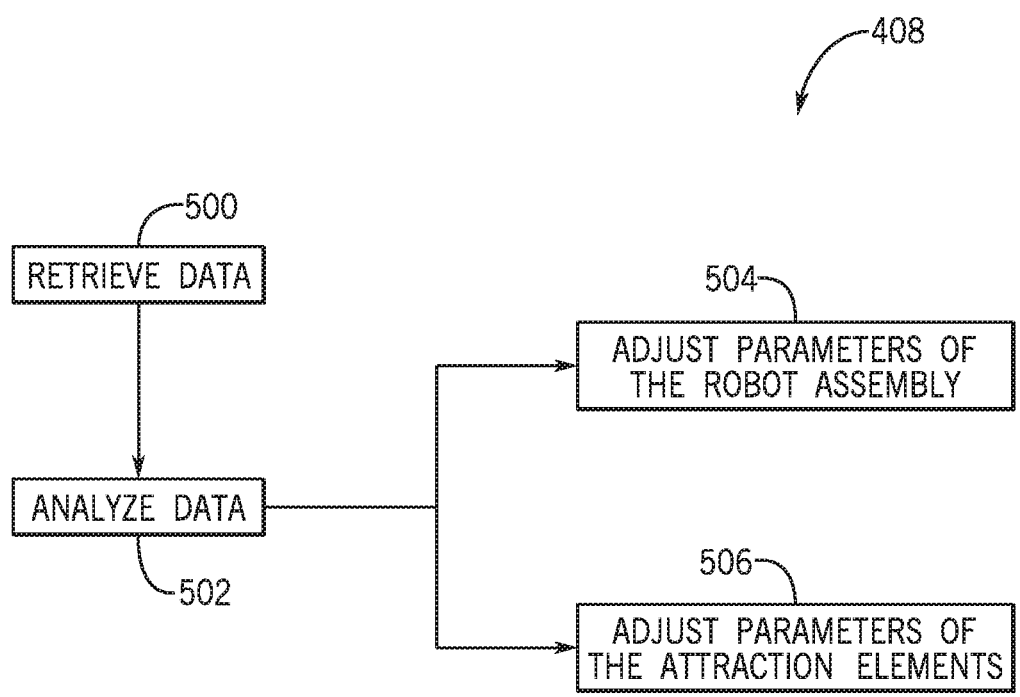
FIG. 13 is a block diagram of an embodiment of a method to process data acquired via a robot assembly, in accordance with an aspect of the present disclosure.

FIG. 13 is a block diagram illustrating an embodiment of the acts associated with of block 408 to evaluate data. At block 500, captured data is retrieved. As mentioned, in one embodiment, captured data may be saved to a memory. Thus, the memory may be accessed in order to retrieve the captured data. In an example, the computing device 126 may be communicatively coupled to the memory in order to transfer the data to the computing device 126. Captured data may additionally or alternatively be transferred to the network 124 such that the computing device 126 may retrieve the data when communicatively coupled to the network 124. Further still, the computing device 126 may be communicatively coupled to the sensor 120 and/or the camera 122 to enable the data to immediately transfer to the computing device 126 upon being captured.

After retrieving the data, at block 502, the user of the computing device 126 may analyze the data to determine if the robot assembly 108 is moving as desired, if the headset 106 is generating virtual elements as desired, and/or other parts of the attraction system 100 are performing as desired. In regards to movement of the robot assembly 108, the user may compare data indicative of the position of the head 170, for example, with data indicative of a force induced on the robot assembly 108 to determine if the robot assembly 108 is moving as desired. Additionally, the user may compare images of the virtual visual elements generated by the headset 106 with the data indicative of the position of the head 170 to determine if the virtual elements are generated as desired. Furthermore, the user may compare the data indicative of a force induced on the robot assembly 108 and/or the images of the virtual visual elements generated by the headset 106 with a particular duration that the attraction system 100 is operating to determine if other aspects (e.g., show effects) of the attraction system 100 are performing as desired. In general, the user may compare the different captured data to adjust parameters of the robot assembly 108, the headset 106, and/or the attraction system 100.

At block 504, the parameters of the robot assembly 108 may be adjusted, which may adjust how the robot assembly 108 moves when the attraction system 100 is in operation. For example, the parameters of the robot assembly 108 may be adjusted to enable the robot assembly 108 to move the head 170 to a different position, in a different manner, and/or at a different speed. Such parameters may be adjusted via the control system 114 implemented to control movement of the robot assembly 108, including adjusting a manner to which the control system 114 adjusts the actuators that may move the adjuster 112, for example. Additionally or alternatively, different parts (e.g., tray 282, adjuster 112) of the robot assembly 108 may be selected, such as parts of a different size. In this manner, when the attraction system 100 is operated again, a different set of data may be captured in response to the adjusted parameters of the robot assembly.

At block 506, parameters of certain elements of the attraction system 100 may be adjusted, including parameters of the headset 106. Adjusting the parameters of the headset 106 may enable the virtual elements to be generated differently. As an example, a different virtual element may be generated during operation of the attraction system 100. Additionally or alternatively, a movement of a virtual element may be adjusted, such as to move more realistically in response to movement of the headset 106. Other parts of the attraction system 100 may also be adjusted. By way of example, parameters of show effects (e.g., music, animated figures), parameters of the ride vehicle 150 (e.g., the seat 370), parameters of the path 152 (e.g., turns), and parameters of any other parts of the attraction system 100 that enhance the experience of the guests 104 may be adjusted.

The steps described in FIGS. 9-13 may enable adjustments of the attraction system 100 to be performed efficiently and/or effectively. In one aspect, adjusting certain parameters based on analyzing the data may provide a precise method to determine if the attraction system 100 provides the desirable experience for the guests 104. In another aspect, the data may be acquired as the attraction system 100 is in development, such as prior to when the attraction system 100 is suitable for human passengers. For example, a ride vehicle 150 suitable to accommodate human passengers may still be in development. However, a robot assembly 108, which may be more readily available than a more complicated ride vehicle 150, may be developed for testing purposes and data collection. In a further aspect, captured data may be accessed and/or analyzed at any time or any geographic location. In other words, the data may be easily transferred and viewed by multiple different users and on multiple different computing devices 126. Thus, the data may be readily available for analysis to adjust the robot assembly 108 and/or the attraction system 100.

Further, although FIGS. 9-13 describe the different steps performed in a particular order, in an additional or alternative embodiment, the described steps may be performed in a different manner. As an example, certain steps may be performed concurrently with one another. For instance, the steps of block 430 to select a dimension of the robot assembly 108 may be performed concurrently with disposing a covering on the head 170 of the robot assembly 108. Additionally, certain steps of block 402 to select the features of the robot assembly 108 may be performed concurrently with certain steps of block 404 to set up the robot assembly 108 on the attraction system 100, such as selecting the dimensions of the robot assembly 108 while coupling the robot assembly 108 to the attraction system 100. Furthermore, certain steps may be repeated, such as calibrating the robot assembly 108, as described at block 464, in multiple iterations prior to operating the attraction system 100, as described at block 466. Further still, steps may be performed in a different order as described. For example, the steps described at block 460 to couple the robot assembly 108 to the attraction system 100 may be performed prior to the steps described at block 432 and/or block 434 to dispose the covering and/or accessories on the head 170. It should also be appreciated that certain steps described in FIGS. 9-13 may at least be partially performed by the control system 114 in addition to or in alternative to by a user. That is, certain steps may be implemented to be automatically performed based on pre-programming of the control system 114.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park attraction, comprising:
a ride vehicle configured to travel along a path of the amusement park attraction;
an attraction controller configured to generate virtual elements;
a robot assembly disposed on the ride vehicle, wherein a head of the robot assembly is configured to move relative to the ride vehicle;
a headset communicatively coupled to the attraction controller, wherein the headset is configured to be disposed on the head of the robot assembly, wherein the headset is configured to display the virtual elements generated by the attraction controller based on a headset position of the headset in the amusement park attraction; and
a camera disposed in the head of the robot assembly, wherein the camera is configured to capture an image of the virtual elements displayed by the headset.

2. The amusement park attraction of claim 1, wherein the robot assembly comprises an adjuster configured to move the head relative to the ride vehicle.

3. The amusement park attraction of claim 2, comprising an additional controller configured to cause the adjuster to move the head in response to a force imparted on the robot assembly, a force imparted on the ride vehicle, a speed of the ride vehicle, an acceleration of the ride vehicle, a location of the ride vehicle in the amusement park attraction, a time that the amusement park attraction is in operation, or any combination thereof.

4. The amusement park attraction of claim 1, wherein the attraction controller is configured to cause the headset to display the virtual elements based on a speed of the ride vehicle, a location of the ride vehicle in the amusement park attraction, a force imparted onto the headset, a time that the amusement park attraction is in operation, or any combination thereof.

5. The amusement park attraction of claim 1, wherein the head comprises a cavity and a tray disposed within the cavity, and wherein the camera is coupled to the tray.

6. The amusement park attraction of claim 1, comprising a computing device configured to cause the camera to capture the virtual elements displayed by the headset, show elements of the amusement park attraction, or both.

7. The amusement park attraction of claim 1, wherein the ride vehicle comprises a power source configured to couple to the robot assembly, and wherein the power source is configured to supply power to the robot assembly when the robot assembly is coupled to the power source.

8. An amusement park attraction, comprising:
a ride vehicle configured to travel along a path of the amusement park attraction;
an attraction controller configured to generate virtual elements;
a headset disposed on the ride vehicle, wherein the attraction controller is configured to generate the virtual elements based on a headset position of the headset in the amusement park attraction, and the headset is configured to display the virtual elements generated by the attraction controller;

a robot assembly disposed on the ride vehicle, wherein the robot assembly comprises a head and a camera disposed in the head, wherein the camera is configured to capture an image of the virtual elements displayed by the headset when the amusement park attraction is in operation;

a sensor configured to detect an operating parameter of the amusement park attraction; and an additional controller communicatively coupled to the robot assembly, wherein the additional controller is configured to adjust a head position of the head based on the operating parameter.

9. The amusement park attraction of claim 8, wherein the operating parameter comprises a force imparted on the robot assembly, a force imparted on the ride vehicle, a speed of the ride vehicle, an acceleration of the ride vehicle, a location of the ride vehicle in the amusement park attraction, a time that the amusement park attraction is in operation, or any combination thereof.

10. The amusement park attraction of claim 8, wherein the additional controller is configured to adjust the head position of the head to emulate movement of a guest when the guest is positioned in the ride vehicle.

11. The amusement park attraction of claim 8, comprising a computing device communicatively coupled to the camera, wherein the camera is configured to transfer the image to the computing device, and wherein the computing device is configured to display the image.

12. The amusement park attraction of claim 11, wherein the computing device is configured to cause the headset to display the image and, concurrently, a value of the operating parameter associated with the image.

13. The amusement park attraction of claim 8, wherein the robot assembly is positioned within a seat of the ride vehicle.

14. The amusement park attraction of claim 13, wherein the additional controller is configured to set the head at a starting head position relative to the seat when the amusement park attraction is not in operation.

15. A robot system of an amusement park attraction, comprising:

a head of a robot assembly, wherein the head is configured to couple to a headset of the amusement park attraction;

a camera disposed in a cavity of the head of the robot assembly, wherein the camera is configured to capture an image of virtual elements displayed via the headset while the headset is coupled to the head of the robot assembly; and an adjuster of the robot assembly, wherein the adjuster is configured to couple to a ride vehicle of the amusement park attraction, and wherein the adjuster is configured to adjust a position of the head relative to the ride vehicle.

16. The robot system of claim 15, wherein the camera is a first camera, wherein the robot system comprises a second camera, wherein the robot system comprises a plurality of trays, wherein each tray of the plurality of trays is configured to individually couple to the head of the robot assembly one at a time, wherein the first camera and the second camera are configured to couple to each respective tray of the plurality of trays, and wherein each tray of the plurality of trays includes a respective distance to separate the first camera and the second camera.

17. The robot system of claim 16, wherein the respective distance of each tray of the plurality of trays is substantially different from one another, wherein each tray of the plurality of trays comprises a base configured to couple to the head, wherein the respective bases each comprise approximately a same dimension, wherein each tray of the plurality of trays comprises a first tray cavity and a second tray cavity, wherein the first camera is configured to be disposed in the first tray cavity and the second camera is configured to be disposed in each second tray cavity of each tray of the plurality of trays, and wherein a respective first tray cavity and a respective second tray cavity of each tray of the plurality of trays are separated by the respective distance.

18. The robot system of claim 15, wherein the robot system comprises a plurality of coverings, wherein each covering of the plurality of coverings is configured to individually fit over the head of the robot assembly one at a time, and wherein each covering of the plurality of coverings comprises a respective color and texture.

19. The robot system of claim 15, wherein the adjuster is configured to rotate the head with respect to the ride vehicle, translate the head with respect to the ride vehicle, or both.

20. The robot system of claim 15, wherein the adjuster comprises a plurality of segments, and wherein each segment of the plurality of segments is configured to move relative to at least one other segment of the plurality of segments.

* * * * *